(12) United States Patent
Hellsten

(10) Patent No.: US 8,698,668 B2
(45) Date of Patent: Apr. 15, 2014

(54) SAR RADAR SYSTEM

(75) Inventor: Hans Hellsten, Linköping (SE)

(73) Assignee: SAAB AB, Linköping (SE)

( * ) Notice: Subject to any disclaimer, the term of this patent is extended or adjusted under 35 U.S.C. 154(b) by 280 days.

(21) Appl. No.: 13/128,642

(22) PCT Filed: Nov. 11, 2008

(86) PCT No.: PCT/SE2008/051292
§ 371 (c)(1),
(2), (4) Date: Aug. 25, 2011

(87) PCT Pub. No.: WO2010/056159
PCT Pub. Date: May 20, 2010

(65) Prior Publication Data
US 2011/0298654 A1   Dec. 8, 2011

(51) Int. Cl.
G01S 13/00   (2006.01)
(52) U.S. Cl.
USPC .................. 342/25 F; 342/25 R; 342/25 A
(58) Field of Classification Search
CPC ..................................... G01S 13/953
USPC ............... 342/25 R–25 F, 109, 191
See application file for complete search history.

(56) References Cited

U.S. PATENT DOCUMENTS

| | | | | |
|---|---|---|---|---|
| 5,818,383 A * | 10/1998 | Stockburger et al. | ......... | 342/109 |
| 6,255,981 B1 * | 7/2001 | Samaniego | ................. | 342/25 R |
| 6,441,772 B1 * | 8/2002 | Hellsten et al. | ............. | 342/25 R |
| 6,633,253 B2 * | 10/2003 | Cataldo | ....................... | 342/25 R |
| 6,943,724 B1 * | 9/2005 | Brace et al. | ................. | 342/25 B |
| 6,952,178 B2 * | 10/2005 | Kirscht | ....................... | 342/25 B |
| 7,109,911 B1 * | 9/2006 | Cataldo | ....................... | 342/25 R |
| 7,183,965 B2 * | 2/2007 | Cho | ............................. | 342/25 R |
| 7,212,149 B2 * | 5/2007 | Abatzoglou et al. | ......... | 342/25 F |
| 2010/0052977 A1 * | 3/2010 | Sathyendra | .................. | 342/25 F |

FOREIGN PATENT DOCUMENTS

| | | |
|---|---|---|
| EP | 1 876 470 A1 | 1/2008 |
| WO | WO 2008/073011 A1 | 6/2008 |

OTHER PUBLICATIONS

International Search Report, dated Jul. 3, 2009, issued in connection with counterpart International Patent Application No. PCT/SE2008/051292.

* cited by examiner

*Primary Examiner* — John B Sotomayor
*Assistant Examiner* — Marcus Windrich
(74) *Attorney, Agent, or Firm* — Venable LLP; Eric J. Franklin

(57) ABSTRACT

A method for detecting targets including moving and stationary targets with a radar system equipped with Synthetic Aperture Radar (SAR) onboard a SAR platform including navigation equipment for accurate determination of the position of the SAR platform. The SAR platform is transversing a stationary ground region and targets in the ground region, in which the SAR platform obtains radar data utilizing at least one antenna. A SAR processor records the radar data and the position of the antenna or antennas for each transmitted radar pulse. Radar data within synthetic sub-apertures, are successively merged in N iteration steps into SAR images of increasing resolution of the surveyed region and wherein each iteration step includes forming a new SAR image at a new iteration level by a linear combination of neighboring SAR images in the previous iteration step. A radar system and a SAR processor used for calculating the detection and positioning of targets including moving and stationary targets.

22 Claims, 5 Drawing Sheets

SAR RADAR SYSTEM

CROSS-REFERENCE TO RELATED APPLICATIONS

This application is the national phase of PCT/SE2008/051292 filed 11 Nov. 2008.

TECHNICAL FIELD

The present invention relates to the field of Synthetic Aperture Radar (SAR) and addresses radar imaging from an aircraft of ground targets which may be stationary or moving on the ground.

BACKGROUND ART

SAR as such is a well-known technology, by which it is possible with a radar device mounted on a moving platform to obtain a much finer angular resolution of the stationary ground than will be furnished by the radar antenna. This refinement is achieved by storing radar data over a length of time and adopting the fact that during this time the radar has registered the ground from many different positions. A SAR processor mathematically transforms these radar data into a SAR image of the ground, which has the angular resolution of an antenna aperture, corresponding to the flight path along which data were stored.

The SAR radar located on a platform e.g. on an aircraft or a satellite moves along a nominal straight path and illuminates a large ground area by means of an antenna. High range resolution pulses are transmitted from the antenna and the return signal from the ground is received by the antenna and recorded along the straight path. By signal processing, high resolution is accomplished both along and transversely of the straight path. A condition for this is that the position of the antenna is known or can be calculated within a fraction of the resolution and that the amplitude and phase of the transmitted and received radar signals are known.

FIGS. 1a and 1b illustrate the fundamental ambiguity of SAR as regards moving targets on ground.

The description uses polar coordinates instead of, as is more common, Cartesian coordinates. By a moving target is henceforth meant an object moving across the ground, the object being known as regards its general properties, e.g. radar cross section order of magnitude and its general pattern of motion, but its actual presence and state of motion are to be determined by the radar measurement. A moving target can as a special case be stationary, with its velocity relative to ground being zero. Henceforth in the description a moving target is including also this special case.

The diagram in FIG. 1a, with an x-axis 101 and a y-axis 102, shows with a first arrow 103 the trajectory of a stationary ground point and with a second arrow 104 the trajectory of a moving target, which are mapped into the same pair, R,Φ, of SAR image polar coordinates. The two trajectories differ by a rigid rotation φ around a z-axis in the rest frame of the SAR platform being located at the origin 105. The axes symbol 108 illustrates the different axes including the z-axis. FIG. 1a thus illustrates movements of ground targets relative a fixed SAR platform. The SAR platform can equally well be considered moving relative ground in the direction of the X-axis 101. The y-axis 102 is thus perpendicular to the path of the SAR-platform. A moving target being located at a true position 106 with polar coordinates R,Φ−φ, at time T=0, will during the SAR processing be misplaced and located at an apparent position 107 having polar coordinates R,Φ. In FIG. 1a the angle φ is negative as the true position 106 is oriented in negative angle direction, i.e. anti-clockwise, in relation to the apparent position 107. These facts are known and fundamental basis for SAR processing.

FIG. 1b is a vector diagram with velocity in the direction of the movement of the SAR platform on an ẋ-axis 110 and velocity in a perpendicular direction on an ẏ-axis 111. The axes symbol 118 shows the different velocity axes, ẋ, ẏ and ż with velocities in the x, y and z directions. FIG. 1b shows a velocity vector 112 of a moving target in the ground frame, i.e. the movement relative to the ground. A moving target velocity vector 117, with velocity in relation to the SAR platform, will have its end point on a circle 113 of diameter 2V, V being the velocity of the moving SAR platform relative to ground. A ground point velocity vector −V (in FIG. 1b shown as −V̄) represents the velocity of a ground point in relation to the moving SAR platform. Varying the processing velocity parameter V→W, and processing the SAR image to contain coordinates Φ outside the region of the antenna footprint any moving target will be depicted as having an apparent position in the SAR image at point R,Φ for the proper selection of W. With the processing velocity W the moving target velocity vector will lie on the dotted circles 114-116 in FIG. 1b. The angle φ is the rigid rotation shown also in FIG. 1a. When the angle φ becomes zero the velocity in the y-direction will be zero.

It is regarded as a known fact that SAR information is ambiguous in the described sense that not only a fixed point on the ground surface (which may correspond to some feature of a parked vehicle for instance), but an entire class linear movements on the ground all maps into the same particular point on the SAR image.

This ambiguity, which is basic to the invention, can be stated mathematically as follows:

Assume a flat ground plane and an aircraft uniformly moving along a rectilinear path parallel to the ground. Capital letters are used for polar coordinates in the ground plane to represent fixed ground points. The SAR image is thus a function $f(R,\Phi)$ assigning an amplitude to each ground point R,Φ. Radar data is represented F(r,t), where r is 3-dimensional distance from the radar antenna phase centre to any point in 3-dimensional space and t is time.

The transformation between data and the SAR image is:

$$f(R, \Phi) = \int_{-T}^{T} F[r_{R,\Phi}(t), t] dt \qquad (1)$$

where 2T is radar registration time. Here $r_{R,\Phi}(t)$ is the range history of the particular ground point R,Φ. $f(R,\Phi)$ is the SAR-image.

The various methods of SAR processing are all different forms of approximations or re-expressions of the fundamental expression (1). The main reason for making such reformulations is to make the evaluation of expression (1) numerically expedient. Reformulations may also invoke extra considerations, such as compensation due to a non-uniformity of the platform path, undulations of the ground, conditions relating the radar antenna and so forth.

According to our assumptions, each ground point R,Φ will follow the path of uniform linear motion in the rest frame of the aircraft. Thus $$r_{R,\Phi}(t) = (R \sin \Phi - Vt)e_X + R \cos \Phi e_Y + He_Z \qquad (2)$$

assuming the aircraft to be heading in the x-direction (all coordinates will be in the SAR platform frame—upper case letters refer to the position of moving targets at time zero and other motion constants, lower case letters to coordinates and variables in general, letters in bold represents vectors, $e_x$, $e_y$ and $e_z$ are basis vectors in x, y and z directions. The polar coordinates R,Φ are defined in FIG. 2 with the basis vectors defining the axes in space. The polar coordinate angle Φ is thus an angle in clockwise direction starting from the $e_y$-axis. The quantity H is the platform altitude over ground and will be assumed constant and known just as the platform velocity V, t is time. Then $r_{R,\Phi}(T)=|r_{R,\Phi}(t)|$ which is the absolute value of the $r_{R,\Phi}(t)$-vector, so the range history is $$r_{R,\Phi}(t) = \sqrt{(R\sin\Phi - Vt)^2 + R^2\cos^2\Phi + H^2} \quad (3)$$

Expression (1) has a most important implication, namely that any target having the range history $r_{R,\Phi}(t)$ will become located in the SAR image in R,Φ. Hence if there is an ambiguity (as there may be) in that several targets have the same range history $r_{R,\Phi}(t)$, the responses from these targets will all be superimposed in R,Φ regardless of the actual target coordinates.

Such ambiguities arise in particular if there are moving targets. Assume that during the few seconds of integration time normally required for SAR, these move in a uniform fashion. Thus in the reference frame of the SAR platform the motion of a moving target can be represented $$r_{mover}(t) = R\sin\Phi e_X + R\cos\Phi e_Y + H e_Z + (v - V e_X)t \quad (4)$$

where v is the moving target velocity relative to the ground. It is possible to test SAR data F(r,t) for the presence of a hypothetical moving target by applying the integration $$f(\text{mover}) = \int_{-T}^{T} F[r_{mover}(t), t] dt \quad (5)$$

Tresholding the retrieved amplitude with respect to the noise statistics of a set of different moving target hypotheses, the presence of a moving target can be obtained with the desired degree of confidence as the retrieved amplitude will be considerably increased at the presence of a moving target. However, while it is possible to detect a moving target in this way, due to the aforementioned ambiguities it is not possible to estimate all the parameters of its motion.

The class of moving targets which all map into the response of a static ground point are easily determined. It is indeed seen that upon a rigid rotation of equation (2) around the z-axis $$r'_{R,\Phi}(t) = (R\sin\Phi - Vt)(\cos\phi e_X - \sin\phi e_Y) + R\cos\Phi(\sin\phi e_X + \cos\phi e_Y) + H e_Z \quad (6)$$

the range response (3) will not be altered. However, (6) may be re-written $$r'_{R,\Phi}(t) = R\sin(\Phi+\phi)e_X + R\cos(\Phi+\phi)e_Y + H e_Z + [V(1-\cos\phi)e_X + V\sin\phi e_Y - V e_X]t \quad (7)$$

Comparing with equation (4), we find that any moving target with parameters:

$R_{mover} = R$ $\Phi_{mover} = \Phi + \phi$ $\dot{x}_{mover} = V(1 - \cos\phi)$ $\dot{y}_{mover} = V\sin\phi \quad (8)$ where φ is arbitrary—will map by integral (5) into the same SAR image coordinates R,Φ. In particular φ=0 corresponds to that R,Φ is a static point scatterer, see FIG. 1b. The non-noticeable states of motion have velocity vectors lying on a circle in the $\dot{x},\dot{y}$-plane with centre at $\dot{x}=V$, $\dot{y}=0$ and diameter 2V (cf. FIGS. 1 and 3).

It is thus possible, for instance, that a vehicle seen in the SAR image, is not at all in the state of remaining stationary at the position apparent from this image, but is actually moving during the registration time. It is a property of the SAR image that such a moving target becomes misplaced in the SAR image, i.e. the true track of the moving vehicle can be quite separated from its apparent position in the SAR image. This is illustrated in FIG. 3. FIG. 3 shows the apparent position 301 of a moving target in a SAR-image at R,Φ. The angle Φ is here negative as it is oriented in anti-clockwise direction from the y-axis. The angle φ is positive in FIG. 3, in contrast to FIG. 1a, as the true position 302 here is oriented in positive angle direction, i.e. clockwise, in relation to the apparent position 301. The true position 302 of the moving target is located at R,Φ+φ as explained in association with FIG. 1a. The SAR platform with the antenna is located at some point 303 along the z-axis. The antenna footprint 304 on the ground, i.e. the area on the ground illuminated by the antenna, is illustrated as an area with a line pattern in FIG. 3. In the example of FIG. 3 the true position of the moving target will thus be moved to an apparent position in the SAR image outside the antenna footprint. The SAR image coordinates R,Φ and the true position R,Φ+φ are related by the angle φ, which together with the velocity parameter W determine the ground velocity vector. The SAR image containing moving targets is seen to take the shape of a first angular sector 305 shown without a line pattern, which spreads an angle of approximately 10°, corresponding to a maximum value of φ for ground velocity <50 m/s and a SAR platform ground velocity of 300 m/s. This can be calculated from expression (8) which gives that the velocity of the moving target in relation to the ground, in this example 50m/s, divided with the velocity of the SAR platform in relation to ground, in this example 300m/s approximately equals φ in radians. In this example the velocity ratio becomes 1/6, which thus corresponds to φ being 1/6 of a radian or 10 degrees. The maximum width of the first angular sector 305, in this example, is thus 10 degrees valid for true positions of moving targets positioned at the borderline of the antenna footprint. The angle φ in FIG. 3 is exaggerated for clarity reasons. For velocities in the opposite direction the spread will for the same reasons result in a second angular sector 306. Within, the sector covered by the antenna footprint 304, which contains the ground clutter, a relatively high SAR resolution is required for moving targets to exhibit sufficient clutter SNR (Signal to Noise Ratio) with respect to the ground clutter in the SAR image. Outside the clutter area, i.e. in the first 305 and the second 306 angular sectors the SAR image is free from ground clutter and moving target detection can be obtained at lower SAR resolution. Detection at such lower resolution allows data to be reduced after which improved resolution and moving target parameter accuracy can be achieved with small processing effort.

Since moving targets typically move at velocities an order of magnitude smaller than the aircraft velocity V it follows from expression (8), and is plainly seen in FIG. 1b, that these moving targets must move in a direction close to the y-direction in order to appear as misplaced stationary ground features in the SAR image. The angle φ will thus be just a few degrees. It may still correspond to a significant misplacement of the moving target in the SAR image since the distance from the radar to the target can be large.

For moving targets discussed so far the accumulated signal energy backscattered from the target into the radar will correspond to the intensity of the target in the SAR image. Generally targets will not move in such a way that they only cause misplacement effects in the SAR image. In the general case, the moving targets will be defocused in the sense that they appear smeared and with lower intensity in the SAR image as compared to cases when they are focused, i.e. the cases discussed so far. Thus generally moving targets will be both misplaced and defocused.

Particularly, if ground targets move in the x-direction at slow velocities they will be defocused. This defocusing effect is significantly less strong than the misplacement effect, and will not be noticeable when resolution is coarse. This means that targets slowly moving in the x-direction remain focused if the resolution is coarse. For high resolution SAR such a motion may however have the effect of making targets defocused to such a degree that they become invisible in the SAR image.

A special version of SAR, so-called GMTI, relies on this effect, viz. that at coarse SAR resolution moving targets remain focused, though they are generally misplaced. GMTI is the established method to detect and position moving targets. GMTI uses several radar channels, related to different phase centres distributed over the actual radar antenna. Any location on the ground will correspond to a certain phase shift between the phase centres. By using two such channels it is thus possible to cancel the ground response coming from any particular point on the ground. By using the GMTI channels to produce a combined SAR image which cancels the ground response at some point on the ground, will cause a moving target being positioned by the SAR process to this point to have a true position somewhere where the ground return cancellation does not apply. Thus it will be highlighted in the combined SAR image. Providing the same combined SAR image for two further channels, the true position of the highlighted moving target can be determined.

In most of the modern SAR-systems, GMTI and high resolution SAR (HR SAR) are used as a combined pair of methods to focus both stationary and moving targets. HR SAR is defined as a SAR system having an operating frequency above 1 GHz and a resolution of approximately less than one meter. The combination fails however in providing a complete situation picture.

A major shortcoming of the GMTI is that the method is based on coarse resolution SAR images. In typical GMTI applications, several targets may be situated within the same resolution cell and for this reason it will not be possible to preserve moving target individuality when the moving targets pass each other at close ranges.

Furthermore, due to the coarse resolution of GMTI, the ground response must be eliminated for the moving target to be detectable at all. Since for motion along paths parallel to the track of the aircraft there is no misplacement between stationary ground and moving targets, targets moving in this way are thus not possible to detect by GMTI. At the same time they may well be defocused and not visible with HR SAR, if the velocity of the moving target is outside the resolution. For motion at right angles to the aircraft track misplacements are large also at moderate moving target velocities enabling efficient ground cancellation and good GMTI performance. However, when the velocity of the moving target is sufficiently small (for instance when the moving target is in a process of stopping or starting) GMTI will not work.

HR SAR has poor performance with respect to moving targets. When SAR resolution is very high, even very small velocity fluctuations will make the targets strongly defocused, or even invisible. Since targets in the process of stopping or starting must change velocity they will always be out of focus and quite likely invisible in HR SAR.

U.S. Pat. No. 6,441,772 B1 discloses a Low frequency SAR radar system. The invention describes a method to process SAR data with so called Fast Factorized Back projection (FFB) and a solution for detecting moving targets. The method proposed in U.S. Pat. No. 6,441,772 B1 is based on FFB for SAR focusing of linearly moving targets, incorporating FFB SAR imaging of the stationary ground as a special case. For stationary ground the method of U.S. Pat. No. 6,441,772 B1 works very well. However there is still a need for an improved method for detecting moving targets.

In summary, current technology provides a ground situation picture which has shortcomings as regards moving targets. The shortcomings are:
  poor target tracking capability,
  targets in certain states of motion will not be detected, and
  the detection ability for moving targets starting or stopping is very poor or non existing.

There is thus a need to achieve a method, a Radar System and a SAR processor for improving the possibility to detect moving targets with respect to the above mentioned shortcomings in particular to preserve moving target individuality during tracking of multiple targets moving in the vicinity of each other.

SUMMARY OF THE INVENTION

The object of the invention is to reduce at least some of the above mentioned deficiencies with prior art solutions and to provide:
  a method
  a radar system
to solve the problem to detect and determine the state of motion of targets within the application areas target tracking, target detection and incorporating the possibility to detect moving targets during start and stop. The object is in particular to use the method for enhancing the possibilities of preserving moving target individuality during tracking of multiple targets moving in the vicinity of each other.

This object is achieved by providing a method for detecting targets comprising moving or stationary targets with a radar system equipped with Synthetic Aperture Radar, SAR, onboard a SAR platform, comprising navigation equipment for accurate determination of the position of the SAR platform. The SAR platform is transversing a stationary ground region and targets in the said ground region, in which the SAR platform obtains radar data by means of at least one antenna. The movement of the SAR platform during recording of the data is essentially rectilinear and uniform in an azimuth direction, and its velocity significantly larger than those of the moving targets. The radar system further comprises a SAR processor recording the radar data and the position of the antenna or antennas for each transmitted radar pulse. Wherein, within synthetic sub-apertures each sub-aperture is covering a surveyed region, being a part of the stationary ground region, radar data are:
  successively merged in N iteration steps into SAR images of increasing resolution of the surveyed region and where
  each iteration step consists of forming a new SAR image at a new iteration level by a linear combination of neighbouring SAR images in the previous iteration step and
  where the linear combination is obtained by a relation such that related coordinates indicates the same target position at a given reference time for all targets having a specific relative velocity with respect to the moving SAR platform and a specific degree of acceleration in the direction orthogonal to the movement of the SAR platform.

The object is further achieved by providing a radar system equipped with Synthetic Aperture Radar, SAR, onboard a SAR platform comprising navigation equipment for accurate determination of the position of the SAR platform. The radar system is arranged for detecting targets comprising moving or stationary targets and for transversing a stationary ground region and targets in the said ground region, in which the SAR platform is arranged to obtain radar data by means of at least one antenna. The SAR platform is arranged to move essentially rectilinear and uniform in an azimuth direction with a velocity significantly larger than those of the moving targets during recording of the data. The radar system further comprises a SAR processor arranged to record the radar data and the position of the antenna or antennas for each transmitted radar pulse. Wherein, within synthetic sub-apertures each sub-aperture is arranged to cover a surveyed region being a part of the stationary ground region, radar data are:

successively arranged to be merged in N iteration steps into SAR images of increasing resolution of the surveyed region (605) and where each iteration step consists of arrangement for forming a new SAR image at a new iteration level by a linear combination of neighbouring SAR images in the previous iteration step and where the linear combination is arranged to be obtained by a relation such that related coordinates are arranged to indicate the same target position at a given reference time for all targets having a specific relative velocity with respect to the moving SAR platform and a specific degree of acceleration in the direction orthogonal to the movement of the SAR platform.

The object is also achieved by providing a SAR processor used for calculating the detection and positioning of targets comprising moving or stationary targets.

The invention proposes an improved method and radar system for moving target detection which in one implementation of the invention is capable of detecting ordinary moving targets with X-band (3 cm wavelength) radar at practical surveillance ranges (50 km).

Further advantages are achieved by implementing one or several of the features of the dependent claims which will be explained below.

DETAILED DESCRIPTION

The invention will now be described in detail with reference to the drawings.

Figure 1A:
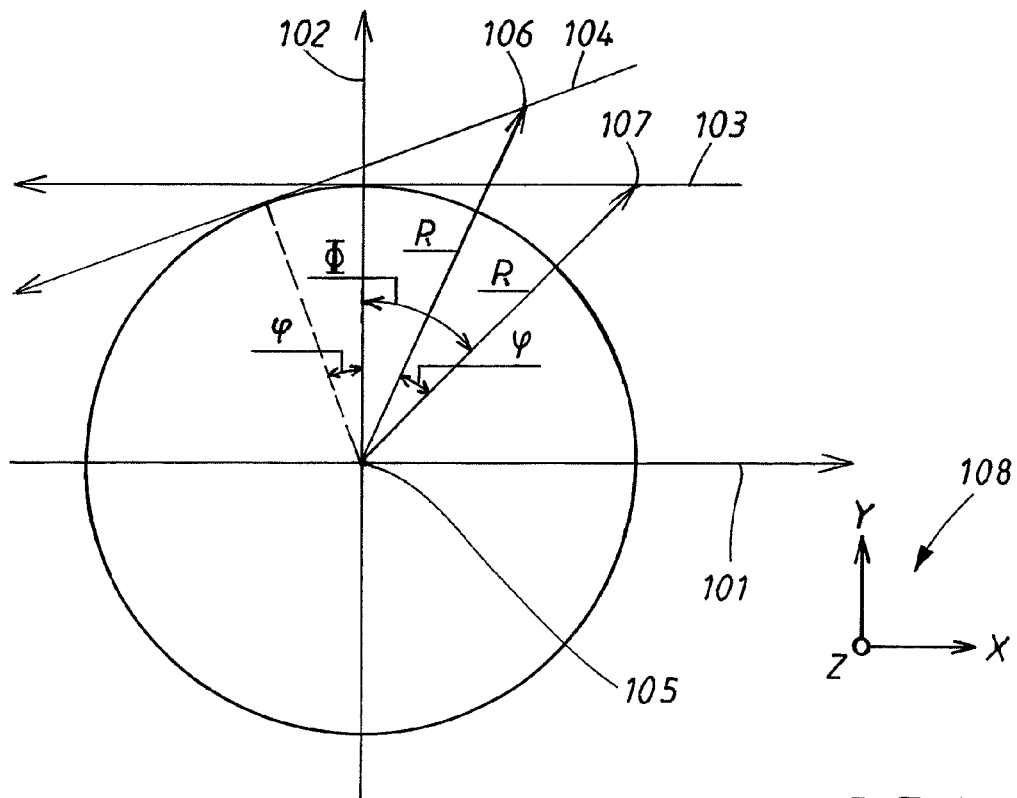
FIG. 1*a* schematically shows the trajectories of a stationary ground point and a moving target.
Figure 1B:
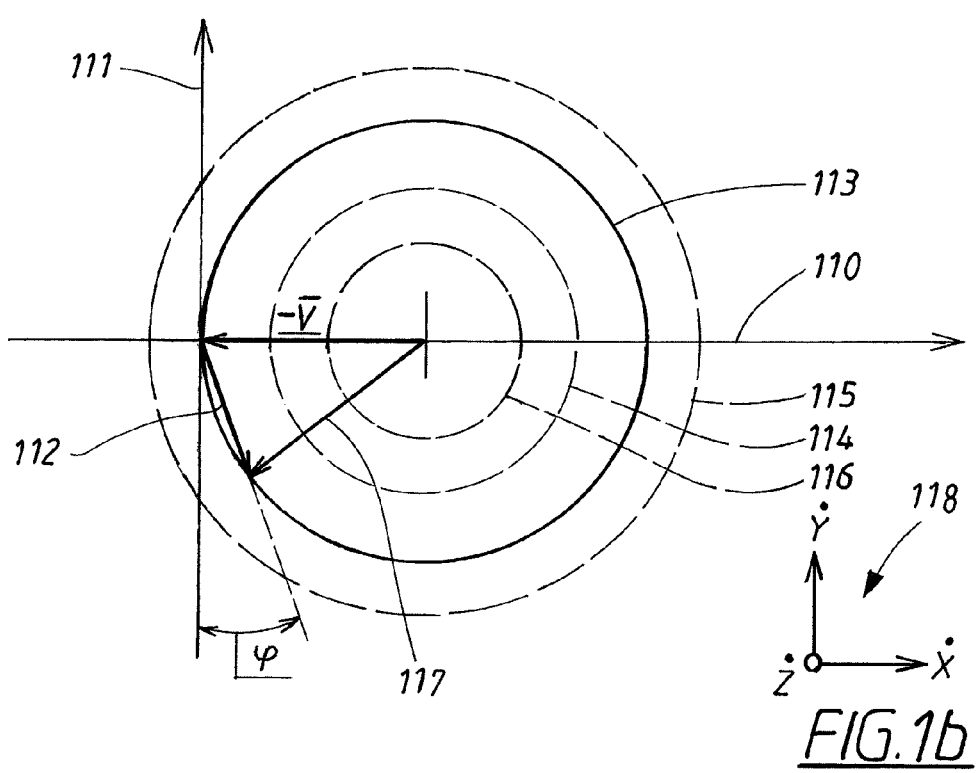
FIG. 1*b* schematically shows the moving target velocity vector positioned on a circle.
Figure 2:
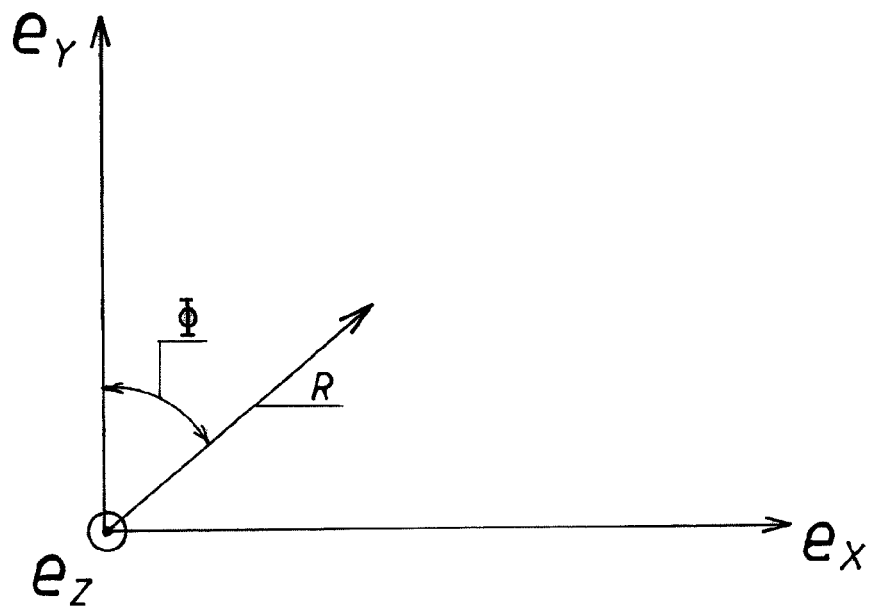
FIG. 2 shows a diagram defining the polar coordinates.
Figure 3:
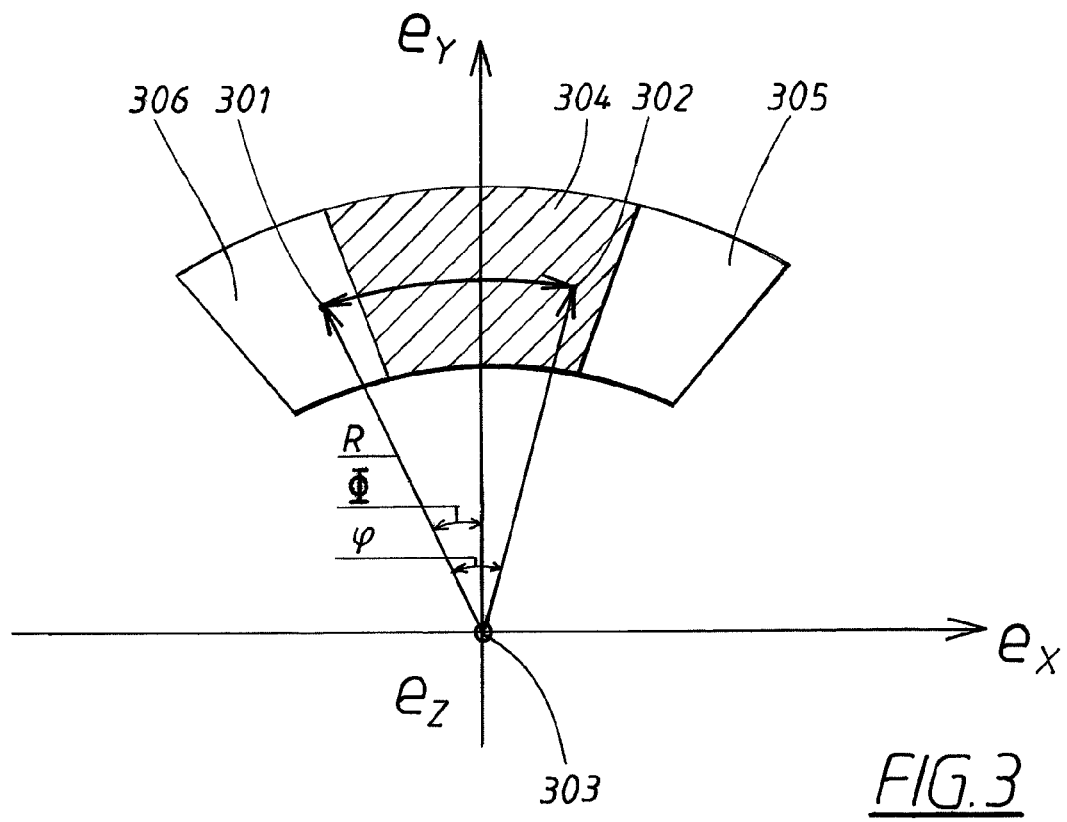
FIG. 3 schematically shows true and apparent positions of a moving target.

FIGS. 1-3 have already been described in the Background part.

The invention is concerned with detecting targets comprising moving or stationary targets with a radar system equipped with Synthetic Aperture Radar, SAR, onboard a SAR platform. The SAR platform comprises navigation equipment for accurate determination of the SAR platform position, and is transversing a stationary ground region and targets in the said ground region, in which the SAR platform obtains radar data by means of at least one antenna. The movement of the SAR platform during recording of the data is essentially rectilinear and uniform in an azimuth direction, and its velocity significantly larger than those of the moving targets. The radar system further comprises a SAR processor recording the radar data and the position of the antenna or antennas for each transmitted radar pulse.

A typical operating frequency of the radar system is around 10 GHz. However also other frequencies can be used, given the restrictions specific to any frequency, or equivalent wavelength, implied by the mathematical rules of the invention described herein.

As pointed out in the Background above, the basic SAR-transform expression (1) can be implemented in a SAR processor in many forms, which all makes its execution numerically different and more or less efficient. Most implementations rely on Fast Fourier Transforms (FFTs). By these methods, direct evaluation of expression (1) in the time domain, is substituted by algebraic manipulations in the frequency domain. The processing effort for a SAR image of length M samples is of the order $M^2 \times^2 \log M$ additions, the majority of which are the evaluation of forward and inverse FFTs. The larger the number of samples, the bigger the SAR image. In contrast, a direct numerical evaluation of expression (1) requires $M^3$ additions. Since typically M=10000, the spectral methods requires of the order $\frac{1}{1000}$ of the numerical effort of direct evaluation.

The present invention is a development of a previous invention, namely so-called Fast Factorized Back projection FFB described in U.S. Pat. No. 6,441,772 B1. That invention set forth a way of processing SAR images by keeping to the time domain of expression (1), viz. avoiding FFTs, in the implementation, in such a way that no more than $M^2 \times^2 \log M$ additions are required.

The advantage with keeping to the time domain is that it allows incorporation of processing adjustments in a way that the spectral domain does not. Such adjustments may for instance be exact compensations for a non-straight or even unknown aircraft registration path. Spectral domain methods to perform these adjustments tend to become highly approximate and not applicable when fractional resolution (resolution compared to the wavelength of the radar) is high. Moreover time domain methods are also applicable for focusing moving ground targets. In particular the present invention will be the adaption of FFB to achieve exactly this.

A brief account of FFB is given in a form suited for moving target focusing, which here will be defined as extended FFB.

In its basic form (ordinary SAR without moving targets) FFB is based on iterative merging in N iteration steps of "synthetic sub-apertures", each sub-aperture covering a surveyed region being a part of the stationary ground region. A sub-aperture is a synthetic sub-aperture of the antenna achieved by storing radar data received by the antenna over a length of time during the movement of the SAR platform in azimuth direction. This has the effect of increasing the length of the antenna aperture, thus achieving a synthetic sub-aperture of the antenna with an increased length. Mathematically it can be explained as follows. Assume that we are given radar data associated to each of $2^N$ equidistant points sampled at intervals $L_0$ along the x-axis SAR track. The radar data can be represented as functions $F_j(R,\Phi)$; $j=0, 1, \ldots, 2^N$ where $F_j(R,\Phi)$ is the received radar amplitude if $\Phi$ is within the antenna footprint and $F_j(R,\Phi)=0$ if $\Phi$ is outside. At sub-aperture merging iteration l assume that the original data have been converted into $2^{N-l}$ SAR images $f_{l,j}(R,\Phi)$; $j=1, \ldots, 2^{N-l}$. Assume each SAR image to be based on a corresponding sub-aperture of length $2^l L_0 = L_l$ and such that the endpoint of one sub-aperture is the start point of the next. For each SAR image, the polar coordinates are assumed to have their origin at the midpoint of the corresponding sub-aperture.

The passage from iteration level l to iteration level l+1 is encompassed letting the sub-apertures at iteration level l be merged pair-wise into $2^{N-l-1}$ sub-apertures of length $L_{l+1} = 2^{l+1} L$. Given the SAR images $f_{l,2j}(R,\Phi), f_{l,2j+1}(R,\Phi)$ of the two merged sub-apertures, a new SAR image is obtained as $$f_{l+1,j}(R,\Phi) = f_{l,2j}(R_-, \Phi_-) + f_{l,2j+1}(R_+, \Phi_+) \tag{9}$$

The coordinates of the new SAR image have their origin at the midpoint of the merged sub-apertures, viz. at the end point of the first and the startpoint of the second. The coordinates $R, \Phi$ and $R_\pm, \Phi_\pm$ stands in the relation that related coordinates indicate the same ground position at a given reference time.

Figure 4:
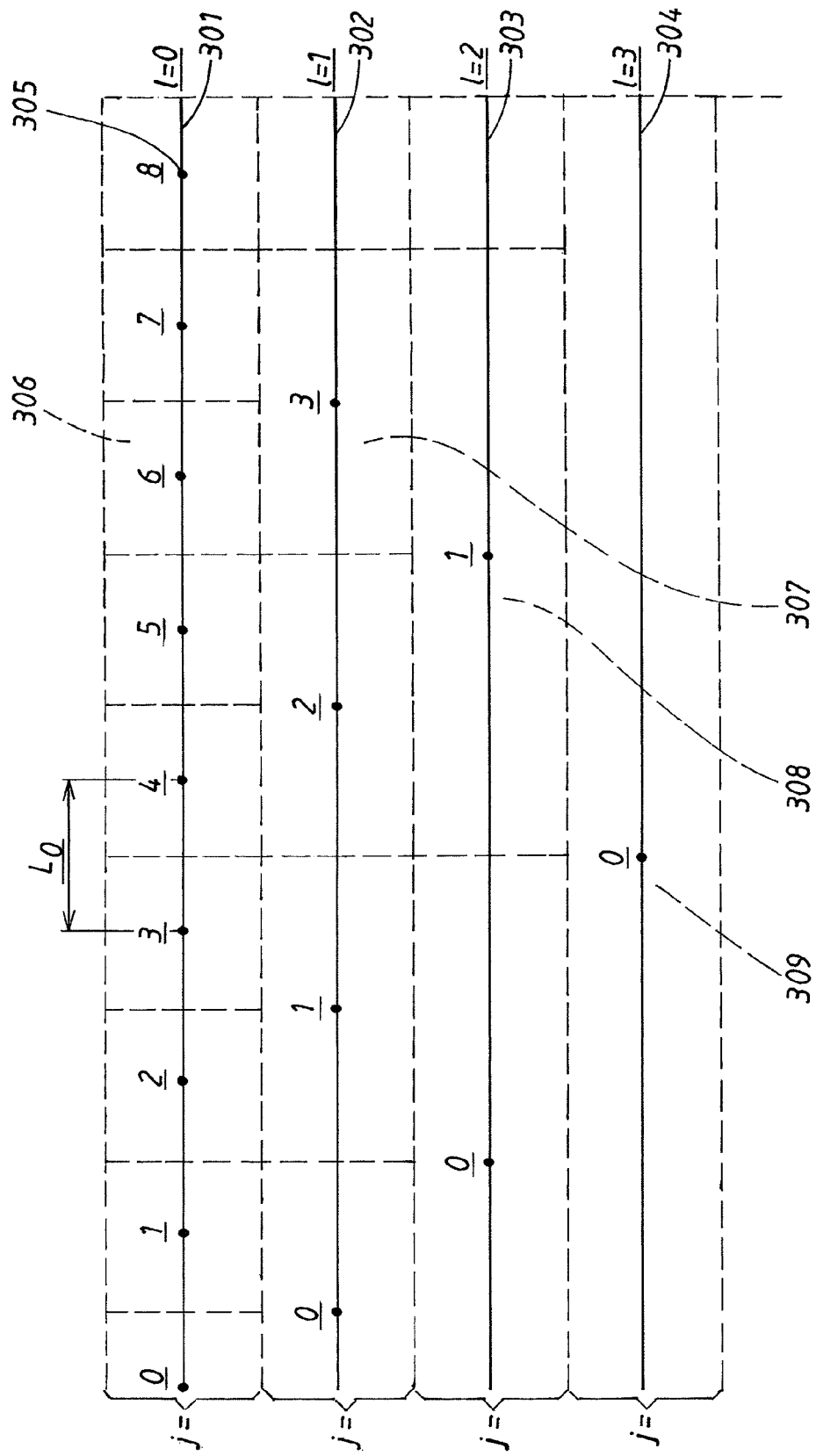
FIG. 4 schematically shows the iteration stages of Fast Factorized Back projection (FFB).

The iterative merging of "synthetic sub-apertures" as described mathematically above is also schematically shown in FIG. 4. In the example of FIG. 4, N=3 and there are thus four iteration levels 301-304 corresponding to three iteration steps (N=3) for l=0, 1, 2 and 3. The $2^N$ equidistant points 305 sampled at intervals $L_0$ along the x-axis SAR track are shown at the first iteration level 301 for l=0 and for $j=0, 1, \ldots, 2^N$ i.e. in this example j assumes values 0, 1, 2 ... 8. First sub-apertures 306 at the first iteration level 301 are merged pair wise into second sub-apertures 307 at the second iteration level 302. The second sub-apertures 307 are then merged pair wise to third sub-apertures 308 at the third iteration level 303. Finally the third sub-apertures 308 are merged pair wise to fourth sub-apertures 309 at the fourth iteration level 304. This means that in the example of FIG. 3:

the first sub-apertures at the first iteration level with j=4 and j=5 are merged into a second sub-aperture at the second iteration level with j=2 the second sub-apertures at the second iteration level with j=2 and j=3 are merged into a third sub-aperture at the third iteration level with j=1 the third sub-apertures at the third iteration level with j=0 and j=1 are merged into a fourth sub-aperture at the fourth iteration level with j=0

The total SAR image reconstruction thus runs in N+1 steps starting by identifying data $F_j(R,\Phi)$ turning into $f_{0,j}(R,\Phi)$ and ending the reconstruction with the single function $f_{N,0}(R,\Phi)$, which is the finished SAR image corresponding to $f_{3,0}(R,\Phi)$ and the fourth sub-aperture 309 in the example of FIG. 3. The angular resolution attained with a sub-aperture length $L_l$ at iteration level l is $\Phi_{res} = \lambda/2L_l$, $\lambda$ being a characteristic wavelength of the radar. The computations must according to the Nyquist criterion be carried out at some rates $\rho_r, \rho_\Phi \geq 2$ of oversampling of range $\rho_r$ and angular $\rho_\Phi$ resolution. In particular $L_0 = D/\rho_\Phi$ where D is the aperture of the radar antenna.

The relations between $R, \Phi$ and $R_\pm, \Phi_\pm$ can be computed from the sub-aperture lengths $L_l$ where according to the cosine theorem:

$$R_\pm = \sqrt{R^2 + \left(2^l \frac{D}{2\rho_\Phi}\right)^2 \mp 2^{l+1} \frac{D}{2\rho_\Phi} R \sin\Phi} \tag{10}$$

and according to the sine theorem:

$$\Phi_\pm \cos^{-1} \frac{R\cos\Phi}{\sqrt{R^2 + \left(2^l \frac{D}{2\rho_\Phi}\right)^2 \mp 2^{l+1} \frac{D}{2\rho_\Phi} R\sin\Phi}} \tag{11}$$

Angular discretization $\Delta\Phi_l$ will be $$\Delta\Phi_l = \frac{\lambda}{2\rho_\Phi L_l} \tag{12}$$

Consider SAR processing of the ground within the antenna footprint. At iteration stage l=0 there are $\rho_\Phi$ beams covering the resolution 3-dB beam width of the physical antenna and in general at iteration stage l there are $\rho_\Phi 2^l$ beams for each of $2^{N-l}$ sub-apertures. Thus, to attain angular resolution at a specific range, the summation according to expression (1) is going to be evaluated $\rho_\Phi 2^l$ times for each iteration, i.e. in total $\rho_\Phi(N+1)2^N \approx \rho_\Phi N 2^N$ times. Assuming a square-shaped image with square resolution cells, the processing burden is thus $\rho_r \rho_\Phi N 2^{2N}$. Equivalently, for a square shaped SAR image of $M^2$ samples the processing burden is, $\rho_r \rho_\Phi^2 \log(M) M^2$ i.e. of the same order of magnitude as for Fourier based methods.

The iteration process can be summarized as follows:

each sub-aperture covering the surveyed region being a part of the stationary ground region, is successively merged in N iteration steps into SAR images of increasing resolution of the surveyed region. The resolution is proportional to the antenna aperture which is increasing for each iteration step, thus also causing an increase of resolution.

each iteration step consists of forming a new SAR image at a new iteration level by a linear combination of neighbouring SAR images in the previous iteration step the linear combination being obtained by a relation such that related coordinates indicate the same target positions at a given reference time for all targets having a specific relative velocity with respect to the moving SAR platform and specific degree of acceleration in the direction orthogonal to the movement of the SAR platform.

The linear combination will be explained further in association with table 1.

Some of the definitions used in the description are:

l=iteration level no $L_l$=aperture length at iteration level l $2T_l$=time to fly aperture length $x_l$=azimuthal resolution or resolution in x-direction, coinciding with flight direction.

$\rho_r$=oversampling of range resolution $\rho_\Phi$=oversampling of angular resolution $\phi$=rigid rotation between the velocity vector of a ground point and the velocity vector of the vector of the moving target seen from the rest frame of the SAR platform (see FIG. 1a). The $\phi$-parameter is representative of the relative velocity of the target in relation to the moving SAR platform.

SAR platform=a platform supporting radar equipment which is moving above ground in a rectilinear and uniform fashion Target=an object moving or stationary in the rest frame of the ground, which is known as regards its general properties, e.g. radar cross section order of magnitude, and its general pattern of motion, but for which its actual presence and state of motion are to be determined by the radar measurement.

The principle of moving target focusing by SAR is to test all assumptions concerning the target state of motion by carrying out the integral (5) for each one of these. This method unites the processing of stationary and moving targets into one single algorithm. It may thus eliminate the drawbacks of the combination of GMTI and HR SAR, which were discussed above.

Clearly for general patterns of motion, the number of state hypotheses would be overwhelming and a hypothesis testing procedure impractical. Restricting motions to be linear in the ground plane they become a 4-parameter set, so the number of hypotheses becomes quite limited compared to the general case. Moreover, according to expression (8), SAR focusing is insensitive to a 1-parameter subset, in this case the angle $\phi$, so hypothesis testing by integral (5) would only concern a 3-parameter sub-set. In contrast ordinary SAR processing consists of assigning amplitudes to the 2-parameter set of ground points $R, \Phi$.

A concern is the robustness of linear motion models in representing true ground moving targets. True, ground moving targets never move in a perfectly uniform way. SAR focusing must be tolerant to the deviations from uniformity in order that linear motion could be used as moving target model. Regrettably the opposite is true—the sensitivity in the SAR focusing process to target accelerations can be very high.

This sensitivity follows from expression (8). Indeed a motion along the y-axis at some velocity $\dot{y}_{mover}$ will cause the displacement $\phi \approx \dot{y}_{mover}/V$. If by some slight acceleration along the y-axis there is a change in $\dot{y}_{mover}$ there will be corresponding change in $\phi$. As soon as this change is larger than the angular resolution in the SAR image, the moving target will be defocused. For a registration time 2T angular resolution is:

$$\Phi_{res} = \frac{x_{res}}{\sqrt{R^2 + H^2}} = \frac{\lambda}{4VT} \tag{13}$$

$x_{res}$ being the resolution in the direction of the x-axis.

One finds that the allowed accelerations of the moving target in the direction of the y-axis $\ddot{y}_{mover}$ must be subjected to:

$$2T\frac{\ddot{y}_{mover}}{V} \leq \Phi_{res} = \frac{\lambda}{4VT} \Rightarrow \ddot{y}_{mover} \leq \frac{\lambda}{8T^2} = 2\frac{V^2}{\lambda}\frac{x_{res}^2}{R^2+H^2} \tag{14}$$

where $$2T\frac{\ddot{y}_{mover}}{V}$$

is the apparent angular displacement during the time 2T due to the acceleration.

Assume for instance that R=50 km, H=10 km, $x_{res}$=1 m, $\lambda$=3 cm and V=300 m/s. Then $\ddot{y}_{mover} \leq 0.002$ m/s$^2$. This result implies that linear motion cannot be considered a suitable model of ground moving targets if a high SAR resolution is required. With the coarse resolution required for GMTI, target acceleration is however of no problem.

As will be seen it is possible to incorporate accelerations $\ddot{y}_{mover}$ in an extended FFB chain for moving target focusing as a remedy the acceleration sensitivity.

In the extended FFB chain equation (9) is substituted for:

$$f_{l+1,j}(W,R,\Phi) = f_{l,2j}(W,R_-,\Phi_-+\phi) + f_{l,2j+1}(W,R_+,\Phi_+-\phi) \tag{15}$$

Here W denotes the velocity parameter. The relation between the 4 parameters $R_{mover}, \Phi_{mover}, \dot{x}_{mover}, \dot{y}_{mover}$ of such a linear state of motion and the three SAR parameters $R, \Phi, W$ is:

$$R_{mover} = R$$

$$\Phi_{mover} = \Phi + \phi$$

$$\dot{x}_{mover} = V - W\cos\phi$$

$$\dot{y}_{mover} = W\sin\phi \tag{16}$$

Clearly, when $W \neq V$ the stationary ground points will be out of focus in the resulting image.

Adjusting the velocity parameter W, the sub-aperture lengths will be scaled by W/V. Thus equations (10), (11) will be substituted by the formulas:

$$R_{\pm} = \sqrt{R^2 + \left(2^l\frac{W}{V}\frac{D}{2\rho_\Phi}\right)^2 \mp 2^{l+1}\frac{W}{V}\frac{D}{2\rho_\Phi}R\sin\Phi} \tag{17}$$

and $$\Phi_{\pm} = \cos^{-1}\frac{R\cos\Phi}{\sqrt{R^2 + \left(2^l\frac{W}{V}\frac{D}{2\rho_\Phi}\right)^2 \mp 2^{l+1}\frac{W}{V}\frac{D}{2\rho_\Phi}R\sin\Phi}} \tag{18}$$

Here $L_l = 2^l WD/V\rho_\Phi$ is the aperture length with respect to the moving target at iteration level l.

Equation (14) concludes that—unless compensated for—moving target acceleration in the y-direction causes an angular defocusing of the position of the moving target in the SAR image if the displacement due to the acceleration is greater than the angular resolution. Actually in the SAR image formation, contributions to the target amplitude, for different moments of time spread in the angular direction in the SAR image (according to equation (9)) by the angular rate:

$$\dot{\phi} \approx \frac{\dot{y}_{mover}}{W} \tag{19}$$

Assume that this spreading has been successfully compensated for in the extended FFB process up to some iteration level l. We are then given two sub-aperture SAR images (corresponding to iteration level l−1), separated by an amount of time $L_l/2W$, in which the moving target is focused in each. However due the acceleration $\ddot{y}_{mover}$ there will be angular mismatch between the two images by the amount:

$$2\phi = \frac{\dot{\phi}L_l}{2W} = \frac{\ddot{y}_{mover}L_l}{2W^2} \quad (20)$$

Thus by inserting the angle $\phi$ determined according to equation (20) in equation (15), compensation for the acceleration is taken care of at iteration level 1. It follows by induction that such compensation can be carried out at every iteration level, given any value for $\ddot{y}_{mover}$.

In order to carry out SAR processing for ground moving targets according to equation (15), one must perform this summation under variation of all four parameters $W,R,\Phi,\phi$. As will be explained, all parameters $\Phi,\phi,W$ for which equation (15) must be evaluated can be picked from a mesh, which for low l, will be very coarse and only at late iterations stages becomes fine. For this reason, the requirement for computational power will be kept within acceptable limits even though the processing task is 4-dimensional in contrast to conventional 2-dimensional SAR processing.

The tolerance of the velocity parameter W is obtained by considering the maximum ground velocity w of a target moving in the x-direction (i.e. parallel to the motion of the aircraft), which does not cause defocusing of the target, i.e. the velocity w is within the resolution in the x-direction. This target is brought to rest in the SAR image by adjusting $W \to W+w$, whereas it moves in the opposite direction on limit of defocusing by adjusting $W \to W+2w$. The tolerance is thus w and the step interval for velocity increments $\Delta W=2w$. Focusing requires that the moving target must stay in the resolution cell throughout the registration time, viz according to equation (13):

$$2Tw \le x_{res} = \frac{\lambda}{4WT}\sqrt{R^2+H^2} \Rightarrow \frac{\Delta W}{2} = \quad (21)$$

$$w \le \frac{\lambda}{16WT^2}\sqrt{R^2+H^2} = W\frac{2x_{res}^2}{\lambda\sqrt{R^2+H^2}}$$

The tolerance to velocity errors, and thus the required number of velocity assumptions, varies through the processing. The variation is obtained by substituting integration time in equation (20) for aperture length. Since $W \approx V$ one may simply set:

$$2T_l = \frac{L_l}{V} = \frac{2^l D}{V\rho_\Phi} \quad (22)$$

Thus we get the step interval for velocity increments at iteration level l as:

$$\Delta W_l = \frac{\lambda V}{2}\sqrt{R^2+H^2}\left(\frac{\rho_\Phi}{2^l D}\right)^2 \quad (23)$$

There is a span of probable ground moving target velocities which limits the variation of $W_l$. If ground moving target velocities are lower than 25 m/s, the velocity parameter $W_l$ must be varied within an interval of ±25 m/s around the platform velocity V through all iterations.

Acceleration tolerance was derived in equation (14). In analogy to velocity tolerance, it will imply the angular step interval at iteration level l, $\Delta\phi_l \approx 2\phi$ for acceleration compensation determined by a corresponding value $\Delta\ddot{y}_l = \ddot{y}_{mover}$. We get by equation (14) and equation (20)

$$\Delta\phi_l = \frac{\lambda}{4L_l} \Leftrightarrow \Delta\ddot{y}_l = \frac{\lambda}{2}\frac{V^2}{L_l^2} \quad (24)$$

The symbol $\Leftrightarrow$ meaning equivalent to.

There is a limit on the meaningful number of iterations l for the method implied by equation (24). In fact for targets to remain focused when merging two sub-apertures, it must be required that the mean acceleration for the two sub-apertures should not differ more than twice the acceleration tolerance i.e. more than $\Delta\ddot{y}_l$ as obtained in equation (24). Since the mean accelerations are formed for intervals of time separated by half the registration time $T_l=L_l/2V$, the acceleration tolerance is a limitation on the rate of acceleration change (the third derivative) over the registration time.

To get an understanding for the strength of this restriction, consider typical motion of ground vehicles. Assume that when attempting to keep a vehicle at constant velocity, velocity fluctuations stay within 0.5 m/s=2 km/h. Moreover assume that the vehicle driver compensates for such velocity changes within a few—say—five seconds. Vehicle accelerations leading to the velocity fluctuation thus consist of an acceleration phase reaching a velocity change of 0.25 m/s for 2.5 seconds followed by a retardation phase for 2.5 seconds in which velocity is checked. The acceleration and retardation are each of the order ±0.1 m/s², which means that a total acceleration change of 0.2 m/s² will occur in 2.5 seconds. One would thus expect accelerations to drift no more than $\dddot{y}_{mover}=0.1$ m/s³. The tolerances may of course be broken for shorter intervals of time, which would mean that at some instances, the state of motion of a ground moving target will change so rapidly that the target cannot be detected. Note however that retardations or accelerations as such, do not prevent detection. For detectability, they must however be sufficiently constant.

Just as for velocities there is a span of probable ground moving target accelerations, which limits the variation of $\phi_l$, i.e. the variation of $\phi$ at iteration level l. Ground moving target accelerations need only to be considered when they are lower than some value—say 1 m/s²—since higher accelerations will be of short duration. The accelerations $\ddot{y}_{mover}$ must accordingly be varied with an interval ±1 m/s² around a zero mean and $\phi_l$ correspondingly varied.

The invention proposes the use of FFB, extended by multiple acceleration and velocity assumptions as described, to enable ground moving target detection without any clutter cancellation. This method will have the aforementioned advantages of capacity against very slow moving targets as well as moving targets in the state of smooth starting and stopping. However according to the conclusion just reached, integration time allowed to reach sufficient SAR resolution must be consistent with acceleration remaining constant to within $\dddot{y}_{mover}=0.1$ m/s³. The method thereby imposes limitations on registration time and thus on other performance parameters as well. Indeed one finds that the number of FFB iterations l is set by:

$$\dddot{y}_{mover} = \frac{\Delta\ddot{y}_l}{T_l} = \frac{\lambda}{8T_l^3} \le 0.1 \text{ m/s}^3 \Rightarrow 2T_l \le 0.53 \text{ s} \quad (25)$$

The symbol $\Rightarrow$ meaning "which leads to".

Moving target detection by the extended FFB method splits into two basic cases, namely:

1) detection of moving targets which are shifted in the SAR image no more than they are still within the radar antenna footprint and 2) detection of moving targets shifted to be outside this footprint, cf. FIG. 3.

In the first case the SAR image will contain stationary clutter superimposed on the target response whereas in the second case the target response will occupy a part of the SAR image void of stationary clutter.

Case 1:

In the first case, a sufficient resolution for detection in the presence of ground clutter must be achieved within the available registration time. HR SAR resolution much finer than the target size is normally called for in order to achieve good ground target detection performance. However for stationary targets high resolution is required to discriminate the true targets (such as stationary vehicles) from false targets (e.g. terrain formations) by shape. In contrast, if the SAR process only had the purpose of discriminating the targets from false alarms caused by speckle, the resolution corresponding to the target size would be sufficient. A multi-look procedure based on this resolution smoothens out the speckle fluctuations. Speckle is the statistic variation of SAR-image pixel amplitudes due to multiplicative noise. A pixel is the discrete element of the digital SAR image representation. Multi-look is statistical averaging of pixel amplitudes from several consecutive SAR registrations.

For moving targets, the shape signatures are not required, since any moving target of significant size is a relevant target.

Target detection for moving targets can thus be modeled on multi-look processing: The criterion determining that any strong response is a moving target is that the motion parameters determined by SAR focusing constitute a continuous chain over time, viz. that detections support a target track. An ideal ground resolution in the present context would be $x_N=5$ m corresponding to a typical extension of ground vehicles. $x_N$ is the resolution in x-direction for iteration number N.

As a consequence of the resolution formula (13), the described moving target detection method is limited by three parameters, viz. wavelength, aircraft velocity and range, which together must satisfy that sufficient ground resolution $x_{res}$ at iteration level l, defined as $x_l$ is achieved in the allotted integration time $2T_l$ $$4T_l x_l \geq \frac{\lambda \sqrt{R^2 + H^2}}{V} \quad (26)$$

For instance, choosing $V=300$ m/s, $\lambda=3$ cm, $T_l=0.25$ s and $x_l=5$ m one finds that $\sqrt{R^2+H^2} \leq 50$ km.

Case 2:

In this situation moving target detection can be carried out within the same short integration time as for GMTI, viz. without the need for processing in several velocity and acceleration assumptions as there is no ground clutter. However, by prolonging integration time further, the motion parameter resolution can be increased beyond what is required for mere detection. An extended integration time, thus enhances tracking performance. For the prolonged integration time, the extended FFB method only needs to be applied in the vicinity of the detections, and can thus run with small processing effort.

We estimate the extra computer burden of extended FFB moving target detection compared to HR SAR processing by means of FFB. Consider the radar parameters just selected. Also assume a SAR antenna $D=0.62$ m, D being the diameter of the antenna aperture. Assuming that $\rho_\Phi=2$, the number of iteration steps is $$l_N = ^2\log\left(\frac{\lambda\sqrt{R^2+H^2}}{x_N D}\right) \approx 10 \quad (27)$$

Denote by $\Sigma_B$ the computer burden for HR SAR processing in 10 iterations. The burden of each iteration and for each velocity/acceleration assumption computation is $\Sigma_B/10$. The number of single velocity/acceleration assumption computations in the extended FFB, at each iteration follows from the following table 1:

| l | $L_l$[m] | $2T_l$[s] | $x_l$[m] | $\Delta W_l$[m/s] | $\Delta \ddot{y}_l$[m/s²] | $\dddot{y}_l$ [m/s³] | #$\Delta W_l$ | #$\Delta \ddot{y}_l$ | $\Sigma$# |
|---|---|---|---|---|---|---|---|---|---|
| 0 | 3.1E−01 | 1.0E−03 | 2.4E+03 | 2.3E+06 | 1.4E+04 | 1.4E+07 | 1 | 1 | 1 |
| 1 | 6.2E−01 | 2.1E−03 | 1.2E+03 | 5.9E+05 | 3.5E+03 | 1.7E+06 | 1 | 1 | 1 |
| 2 | 1.2E+00 | 4.1E−03 | 6.0E+02 | 1.5E+05 | 8.8E+02 | 2.1E+05 | 1 | 1 | 1 |
| 3 | 2.5E+00 | 8.3E−03 | 3.0E+02 | 3.7E+04 | 2.2E+02 | 2.7E+04 | 1 | 1 | 1 |
| 4 | 5.0E+00 | 1.7E−02 | 1.5E+02 | 9.1E+03 | 5.5E+01 | 3.3E+03 | 1 | 1 | 1 |
| 5 | 9.9E+00 | 3.3E−02 | 7.6E+01 | 2.3E+03 | 1.4E+01 | 4.1E+02 | 1 | 1 | 1 |
| 6 | 2.0E+01 | 6.6E−02 | 3.8E+01 | 5.7E+02 | 3.4E+00 | 5.2E+01 | 1 | 1 | 1 |
| 7 | 4.0E+01 | 1.3E−01 | 1.9E+01 | 1.4E+02 | 8.6E−01 | 6.5E+00 | 1 | 3 | 3 |
| 8 | 7.9E+01 | 2.6E−01 | 9.5E+00 | 3.6E+01 | 2.1E−01 | 8.1E−01 | 2 | 10 | 20 |
| 9 | 1.6E+02 | 5.3E−01 | 4.7E+00 | 8.9E+00 | 5.4E−02 | 1.0E−01 | 6 | 38 | 228 | where:
l=iteration no
$L_l$=aperture length at iteration l
$2T_l$=time to fly aperture length
$x_l$=azimuthal resolution or resolution in x-direction at iteration level l, coinciding with flight direction.
$\Delta W_l$=step interval for velocity increments at iteration l which does not cause defocusing of the target. Half of this value is the tolerance value.
$\Delta \ddot{y}_l$=step interval for acceleration increments at iteration l which does not cause defocusing of the target. Half of this value is the tolerance value.
$\dddot{y}_l$=rate of acceleration change
$\Delta W_l$=number of velocity computations or number of velocity assumptions
$\Delta \ddot{y}_l$=number of acceleration computations or number of acceleration assumptions
$\Sigma$#=total number of computations being equal to the product of velocity and acceleration assumptions.

In the example of table 1, N=9 and m=6 which means that there are 9 iteration steps and 10 iteration levels where the first iteration level is the start-up level for the first iteration corresponding to l=0.

The parameters in table 1 are calculated as follows:

$L_0$ is chosen to be 0.31 m at iteration level 0. The length $L_l$ is then doubled for each iteration step.

$2T_l$ is the time to fly the aperture length $L_l$ at a velocity of 300 m/s.

$x_l$ is calculated according to equation (21) with $\lambda=3$ cm, R=50 km, H=10 km, W=300 m/s and using the $T_l$ value for the iteration level.

$\Delta W_l$ is calculated according to equation (23) $\rho_\Phi=2$, D=0.62 m and V=300 m/s.

$\Delta \ddot{y}_l$ is calculated according to equation (24) with $\lambda=3$ cm, V=300 m/s, for the $L_l$ value at the iteration level.

$\ddot{y}_l$ is calculated according to equation (25) with $\lambda=3$ cm for the $T_l$ value at the iteration level.

As moving targets are assumed to have velocities below 25 m/s, the velocity parameter $W_l$ must thus be varied within an interval of ±25 m/s. This means that when $\Delta W_l$ becomes less than 50 m/s, more than one velocity assumption is needed. When l=8, $\Delta W_l=36$ m/s and two velocity assumptions thus covers 72 m/s which is above the maximum interval of 50 m/s. The number of velocity assumptions $\#\Delta W_l$ thus is equal to 2 when l=8. When l=9, $\Delta W_l=8.9$ m/s and 6 velocity assumptions thus covers 53.4 m/s which is just above the maximum interval of 50 m/s.

The acceleration of moving targets are assumed to be lower than 1 m/s² since higher accelerations will be of short duration, i.e. the acceleration interval is within 2 m/s². This means that when $\Delta \ddot{y}_l$ less than 2 m/s² more than one acceleration assumption is needed. When l=8, $\Delta \ddot{y}_l=0.21$ m/s² and ten acceleration assumptions thus covers 2.1 m/s² which is above the maximum interval of 2 m/s². The number of acceleration assumptions $\Delta \ddot{y}_l$ thus is equal to 10 when l=8. When l=9, $\Delta \ddot{y}_l=0.054$ m/s² and 38 acceleration assumptions thus covers 2.052 m/s² which is just above the maximum interval of 2 m/s².

The total number of computations of velocity and acceleration assumptions $\Sigma\#$ is then calculated as the product of velocity and acceleration assumptions in order to have all combinations of velocity and acceleration. The assumptions thus represent all conceivable combinations of velocity and accelerations for a moving target. The velocity is restricted to a specific relative velocity with respect to the moving SAR platform as defined in association with table 1. The acceleration is restricted to a specific degree of acceleration in the direction orthogonal to the movement of the SAR platform as defined in association with table 1. The accelerations should be sufficiently small to be considered consistent with keeping the velocity of the moving target constant over time. The restrictions on acceleration changes are derived in equations (14) and (24).

The linear combination mentioned above comprises a relation of coordinates of target positions in SAR image pairs. Related coordinates $R, \Phi$ and $R_\pm, \Phi_\pm$ indicate the same target position at a given reference time for all targets having a specific relative velocity with respect to the moving SAR platform and a specific degree of acceleration in the direction orthogonal to the movement of the SAR platform.

The overall sum of single velocity/acceleration assumption computations is 258, which means that the computational burden is 25.8 times larger than single assumption SAR processing attaining 5 m azimuth resolution. In the present case the SAR image will extend in azimuth angle far beyond the antenna footprint as depicted in FIG. 3. However, as discussed, outside the footprint, detections can be made before the process is split in several assumptions, viz. at iteration stage 6. Therefore the processing burden is set by the SAR image size, which is determined by the antenna footprint as in ordinary HR SAR.

The SAR images in each iteration step are thus formed for all relative velocities which are conceivable for the moving targets and all such small accelerations, which are considered consistent with keeping the velocity of the moving target constant over time. This is performed by letting the SAR image resolution and the density of velocity and acceleration assumptions increase with increasing iteration level to an extent such that SAR image pairs will remain related by related coordinates corresponding to the same target position at the SAR resolution of any iteration level, by selecting the closest assumption within the set of assumptions for velocity and acceleration for each target made at this particular iteration level.

Range resolution can be chosen similar to azimuth resolution, viz. of the order 5 m. Since the required real time processing power (processing effort divided by time) roughly increases as $N^2 x^2 \log N$, the power required for—say—$0.5 \times 0.5$ m HR SAR is about 20 times that of 5×5 m resolution SAR processing as $N \approx 3$ when moving from a resolution of 5 m at the first iteration level to a resolution of 2.5 m after the first iteration step, to a resolution of 1.25 m after the second iteration step and to a resolution of about 0.6 m after the third iteration step, corresponding to N=3. N is the number of iteration steps. Thus the multi-assumption moving target detection SAR method proposed has about the same processing power requirements as single assumption HR SAR operating at this higher resolution. State of the art processing technology provides this processing power for one square kilometer or more at 50 km range. Note that 1 sqkm (square kilometer) and 5×5 m ground resolution corresponds to $10^7$ resolution cells in $R, \Phi, \ddot{y}, W$-space. If a pixel is 5×5 m, there will be 200×200=40000 pixels within a SAR image of 1 sqkm. When N=9 there will be 228 SAR-images, as there is one SAR-image per velocity and acceleration assumption (see table 1), and thus $228 \times 40000 \approx 10^7$ pixels within 1 sqkm.

The core of the invention is the method of focusing SAR images to moving vehicles by selecting processing parameters tuned to the moving targets' state of motion by the methods presented above. To define a complete piece of radar equipment for moving target detection the method must be complemented as regards procedures for both target detection and target positioning. The latter requirement is due to the fact that the fundamental indeterminacy of expression (8) applies to the method and states that moving targets detected will neither be known as regards azimuth position or ground velocity magnitude and heading.

Figure 5:
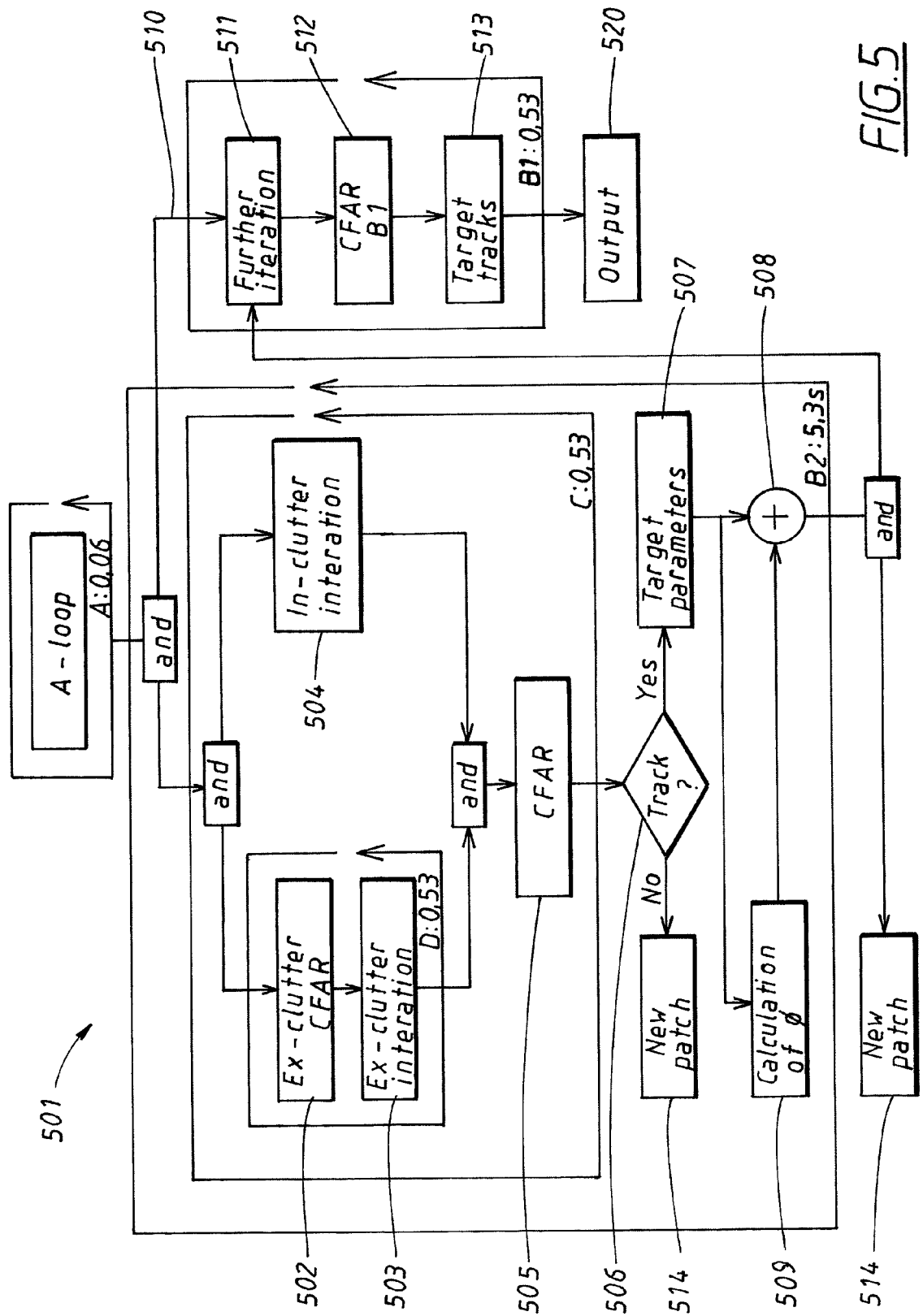
FIG. 5 schematically shows structure for detection and tracking of moving targets by multi-beam SAR focusing.
Figure 6:
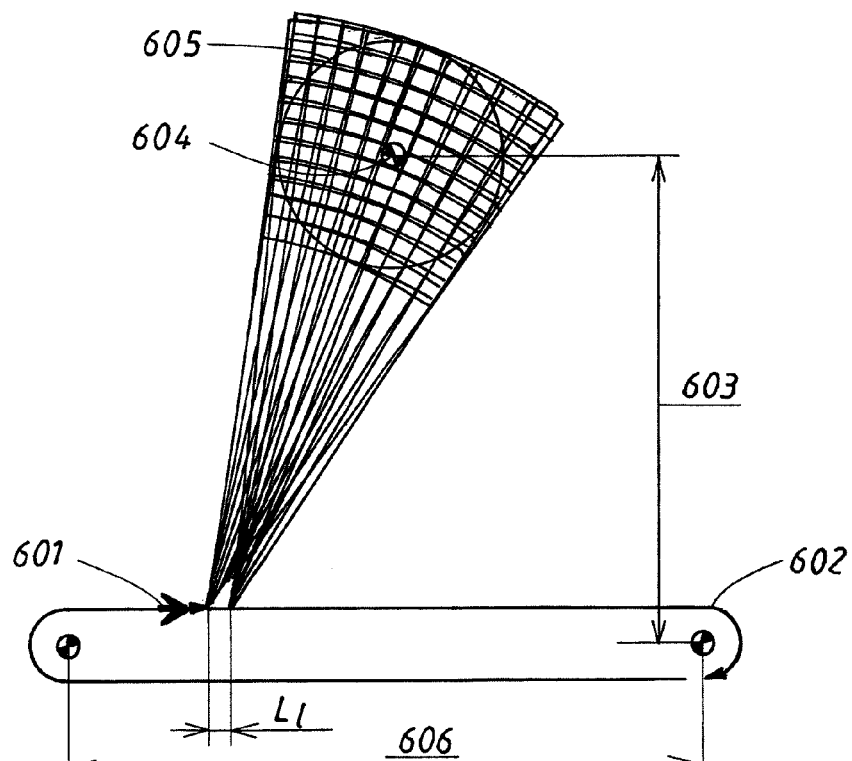
FIG. 6 is a top view schematically showing an example of geometry for moving target tracking by multi-beam radar.

FIG. 5 provides a graphical view of the method, with a conceived imaging geometry shown in FIG. 6.

First consider methods for target detection. As already discussed above, these methods rely on initiation of target tracks, in a sense corresponding to multi-look processing in single assumption SAR. In the present case the method consists typically of the following four main steps:

1. Apply Constant False Alarm Rate (CFAR) thresholding, well known to the skilled person, to the 228 SAR images obtained at 0.53 s intervals at iteration level 9, see table 1. The obtained detections are represented as 5-tuples $(p, n_R, n_\Phi, n_{\ddot{y}}, n_W)$, where p is a batch number ranging from 0 to P, n is the discrete representation of the state of motion parameters $R, \Phi, \ddot{y}, W$ representing a particular target.
2. Consider these detections for sets of—say—10 consecutive batches p=0, . . . , 9 where p is ranging from 0 to P, the total number of batches thus being P+1. In the example with 10 batches the total registration time will be 5.3 s (10×0.53).

3. Consider a chain of detections constituting a validated target track defined by a track validation algorithm as:

$$\{(0, n_R, n_\Phi + a(0), n_{\ddot{y}} + b(0), n_W + c(0)), \quad (28)$$
$$\ldots, (9, n_R, n_\Phi + a(9), n_{\ddot{y}} + b(9), n_W + c(9))\}$$

where $$\left.\begin{array}{l} a(i) - a(i-1) \\ b(i) - b(i-1) \\ c(i) - c(i-1) \end{array}\right\} = -1 \text{ or } 0 \text{ or } 1 \quad (29)$$

and where a(i), b(i) and c(i) are integers, a(0)=b(0)=c(0)=0 and i is an integer ranging from 0 to P. (imperfect tracks with one or several detections missing in the chain may also be allowed). Equation (29) is thus a check of if one and the same target remains detectable from one 0.53 s interval to the other and equations (28) and (29) defines the track validation algorithm.

4. Report these tracks as the verified targets and reject all other detections.

FIG. 5 shows a tracker structure 501 comprising a structure of processing for detection and tracking of moving targets by multi-beam SAR focusing (cf. FIG. 6). The flow chart of FIG. 5 refers to an example with small ground patches (1 sqkm) of the total surveillance area (100 sqkm), each of which is about square sized and contained in the radar antenna footprint. There are thus in this example of the invention a surveyed region comprising 100 patches and the antenna pattern comprises e.g. 10 beams with 10 range intervals for each beam thus making up 100 sub-regions of the ground covered by the multi-beam radar, each sub-region covering a patch. Each beam is thus covering 10 patches as each beam has 10 range intervals. The flow chart contains five loops A, B1, B2, C and D. Loops C and D are sub loops within the loop B2. The time periods for one cycle of each loop, for the example considered with 9 iteration steps, are given in the flow chart. Loop A performs the initial extended FFB iteration levels 0-6 according to table 1 in about 0.06 seconds. Loop A is a motion insensitive sub process of the extended FFB as only one velocity and one acceleration assumption is required. Loop A is continuously repeated over the total surveillance area (or the surveyed region 605, see FIG. 6). In general there are thus m iteration steps, m<N, performed covering the surveyed region where data from one velocity computation at each iteration level using velocity increments $\Delta W_l$ of a processing velocity W, and data from one acceleration computation for acceleration increments $\Delta\ddot{y}_l$ used in the motion insensitive process comprising the A-loop for producing one SAR-image of the stationary ground points and the targets per iteration level. In the example of table 1 there are 6 iteration steps in the motion insensitive process, thus m=6.

N−m further iteration steps are then performed for a selected patch (604, see FIG. 6) being a part of the surveyed region (605, see FIG. 6). Each iteration step uses a target detection process at each iteration level with data from at least three computations, comprising at least one velocity computation with the velocity increments $\Delta W_l$ and at least one acceleration computation with the acceleration increments $\Delta\ddot{y}_l$ producing one SAR-image per combination of velocity and acceleration computation and for detecting targets and target tracks as well as calculating target parameters R,Φ, a processing velocity W and an acceleration $\ddot{y}$ in a direction perpendicular to the azimuth direction, the R,Φ,$\ddot{y}$,W-parameters defining an R,Φ,$\ddot{y}$,W-space for each target. In the described example of table 1 and FIG. 5 there are 9 iteration steps, thus N=9. The obtained data from the A-loop is in this example processed further at iteration levels 7-9 in the loop B2 for one selected patch. When the loop B2, in the example of FIG. 5, has been performed for the selected patch after about 5 s, a new patch is selected and the loop B2 is performed for this patch. The B2 loop is then repeated for each of the 100 patches, i.e. it will take about 500 s to run through all 100 patches.

Loop B2 starts with receiving SAR processing results from loop A comprising iteration steps 0-6, for a first patch. The moving targets for the selected patch are detected by first conducting all iterations in the A-loop requiring only one velocity and acceleration assumption for all conceivable target velocities and accelerations. The information from the A-loop is fed into two parallel processing paths, a first path and a second path.

The first path comprises ex-clutter targets, i.e. targets which have an apparent position outside an antenna footprint (304) defining the boundaries of the SAR image of stationary ground, but a true position within the selected patch. This corresponds to targets moving relatively fast in order to achieve a sufficient misplacement to move the apparent position from one patch to another. The ex-clutter targets are possible to detect through a CFAR thresholding scheme in processing step ex-clutter CFAR (502), prior to further motion sensitive iteration steps, in this example iteration steps 7-9, which are then conducted in processing step ex-clutter iteration (503) only for the SAR image fragments and velocity and acceleration parameter assumptions which are in the immediate vicinity of the position, velocity and acceleration parameters of the detected targets. These further iteration steps enhance the accuracy of motion parameter determination of the detections made in processing step ex-clutter 502. The processing burden for achieving this accuracy is however small.

One cycle of processing steps ex-clutter 502 and ex-clutter iteration 503 comprises a D-loop with a cycle time of 0.53 s in the example of FIG. 5.

One cycle of the processing steps in the first and the second paths together with a processing step CFAR (505) is defined as a C-loop. The C-loop is repeated at least for two cycles and defines the target detection process.

The second path comprises in-clutter targets, i.e. targets which have an apparent and true position inside the antenna footprint (304) defining the boundaries of the SAR image of stationary ground. For these targets, further in-clutter iterations (504), in this example iteration steps 7-9, involving processing of the entire SAR image of the surveyed region must be performed, thus improving resolution.

The two paths are followed by a fusion of data and further CFAR evaluation in the processing step CFAR (505) resulting in the complete determination of state of motion for detections forming moving target candidates. Detections, i.e. moving and stationary target candidates are fed to a processing step track 506. A stationary target is, as explained earlier, actually a special case of a moving target having a velocity equal to zero. Processing steps 502-505 comprises the loop C which in this example with 9 iterations takes about 0.53 corresponding to the time to fly the synthetic aperture length at the tenth iteration level, i.e. after 9 iterations, see table 1. In this example the loop C, corresponding to the main step 1 for target detection, is then repeated 10 times, main step 2, and parameters for detected target candidates are fed to the processing step track 506 for target validation. One batch p of target parameters is produced for each C-loop cycle.

The target positioning process comprises processing information from the C-loop in the processing step, track (506), where detected target candidates are analysed according to a track validation algorithm in order to detect valid target tracks. The track validation algorithm is performed according to equations (28) and (29). Target parameters for valid tracks are fed to a processing step, target parameters (507), and invalid target tracks causes the selection of a new patch (514) and initiation of a new C-loop for this new patch. After at least 2 iterations, in this example 10 iterations of loop C (5.3 s), a new patch is selected for processing.

The detected target parameters comprising $R, \Phi, \ddot{y}, W$ from processing step, target parameters (507), are fed to processing steps, target data (508) and calculation of $\phi$ (509). In the processing step, calculation of $\phi$ (509), target positioning for detected targets are calculated by determining a $\phi$-parameter according to a $\phi$ determination process. The $\phi$ determination process uses equation (33) for calculation of the $\phi$-parameter. The processing results from processing step, calculation of $\phi$ (509), are fed to the processing step, target data (508). The processing results comprising the detected target parameters $R, \Phi, \ddot{y}, W$ and $\phi$ available in the processing step, target data (508), is thus the result of a target detection and positioning process comprising information processing in the C-loop and in the processing steps, track (506), target parameters (507) and calculation of $\phi$ (509), one cycle of which is defined as the B2-loop. The completion of the B2-loop initiates the start up of a new C-loop for a new selected patch (514) using loop A data as input.

In the processing step track 506, corresponding to main step 3, detected targets are analysed according to equations (28) and (29) in order to detect valid target tracks. The target parameters included in valid tracks are fed to the processing step 507, target parameters. The detected target parameters comprising $R, \Phi, \ddot{y}, W$ from the processing step target parameters 507 are fed to the processing steps 508, target data, and 509, calculation of $\phi$. In processing step calculation of $\phi$, 509, target positioning for detected targets is calculated by determining the $\phi$-parameter according to equation (33) as will be further explained below. The processing results from the processing step calculation of $\phi$, 509, are fed to the processing step target data, 508. The processing results comprising the detected target parameters $R_{mover}, \Phi_{mover}, \dot{x}_{mover}, \dot{y}_{mover}$ and $\phi$ of validated target tracks, form a complete description of the state of motion of moving ground targets, are now available in processing step target data, 508, from which they are fed to loop B1. The target detection and positioning loop B2, comprising processing steps 502-509, is now completed for the first patch and loop A data are used to initiate for a new patch in loop B2. The target positioning process is a sub part of the B2 loop, comprising the processing steps track 506, target parameters 507, calculation of $\phi$ 509 and target data 508. In this process the target position within the patch is calculated by determining the $\phi$-parameter representing the relative velocity of the target in relation to the moving SAR platform.

Each combination of velocity and acceleration computations performed in the B2 loop represents an assumption of possible target parameters.

Data fed from the loop B2 are used as initial data in the loop B1 which requires initial data in the form of the target parameters $R_{mover}, \Phi_{mover}, \dot{x}_{mover}, \dot{y}_{mover}$ and $\phi$ in current or previous patches. The B1 loop, comprising processing steps 511-513 in series, is run for the surveyed region for all detected targets. For each 0.53 s cycle of the B1 loop a B1-output 520 comprises updated and thus continuously validated target tracks and positions for the surveyed region.

In an extended surveillance process, the surveillance area is extended to the surveyed region by using outputs from the motion insensitive process, the target detection process and the target positioning process by calculating SAR-images in the immediate surroundings in $R, \Phi, \ddot{y}, W$-space of each track. The extended surveillance process comprises processing in the continuously repeated B1-loop, information available from outputs of the B2-loop and the A-loop and where one cycle of the B1-loop comprises the following processing steps performed in series:

in a processing step further iteration (511), the outputs of the B1- and the B2-loop are used to extract out of the output (510) of the A-loop further motion sensitive iteration steps from the SAR image fragments and velocity and acceleration parameters assumptions which are in the immediate vicinity of the position, thus obtaining velocity and acceleration parameters of the detected targets. The further iteration (511) is then conducted only for validated moving targets. The input to the first processing step of the B1 loop, further iteration, 511, is thus composed of the output from the processing step target data, 508, of the B2 loop as mentioned above, the output of the B1 loop for its previous 0.53 s iteration and the A-output 510 of the A-loop representing iterations 0-6 for the surveyed region for every 0.53 s. The processing in step further iteration, 511, corresponds to the processing in step 503 in the D loop described above. Processing just in the vicinity of detections relaxes the processing burden so the processing in step further iteration 511 can without any undue load on the computer be performed for the surveyed region.

in the second processing step of the B1 loop, CFAR B1, 512, a CFAR thresholding is performed for the surveyed region.

finally in the third processing step of the B1 loop, target tracks 513, validated target tracks are generated for the surveyed region by performing processing corresponding to the processing steps track, 506 and target parameters, 507 of the B2 loop and forms the output 520 of the B1-loop.

This means that by changing to a new patch in the B2-loop, the previously surveyed patches will remain updated in the B1-loop and thus validated targets tracks for the entire surveyed region (605) will be updated by the B1-loop, whereas the B2 loop will be used to initiate new target tracks for one patch a time.

For instance one may contemplate surveying the surveyed region comprising a 10×10 km region divided into 1×1 km squares as used in the example above, each being visited for 5.3 s for target detection, corresponding to loop B2, whereas tracking of detected target continue over the entire region in the loop B1. The revisit rime for target detection in a certain patch is thus 530 s.

The extension of tracks by the B1 loop is the final stage in false alarm rejection. Indeed most of the tracks supported by just one 5.3 s batch are likely to be just false alarms.

Considering the table above, it is seen that the computational effort is small up to iteration 7. Each computation is an assumption of a certain velocity or acceleration. These computations are also common for all states of motion. For this reason in the proposed scheme of an extended surveillance region it is suitable to process this large region in its entire in these initial stages, corresponding to the loop A above. The final stages will then be carried out in two parallel ways viz. 1) processing all velocity and acceleration assumptions in a 1×1 km square, i.e. performing the loop B2, and 2) continuing tracking in loop B1 by processing around detected motion parameters in the B1 loop for the rest of the 10×10 km square (in the same manner done in the D loop for the detection stage for targets focused to be outside the antenna footprint).

We now turn to target positioning corresponding to the processing step calculation of φ, 509, described above. This is suitably applied as an intermediate stage after target detection and before the continued tracking of the tracks established in the detection stage.

Of particular suitability for target positioning is the technique of coherent monopulse. We chose to describe a radar system of monopulse type as having an adjacent radar channel besides the ordinary one. Each channel is connected to a separate phase center on the radar antenna. Assume the adjacent channel antenna phase center displaced some small distance Δx along the (negative) x-axis or azimuth direction. The two channels obtain simultaneous radar data which are fed into the SAR processor producing one SAR image for each channel. The distance Δx is assumed to be large compared to the operating wavelength λ of the radar system but small compared to both range and azimuth resolution.

FIG. 6 is a top view showing a preferred geometry for moving target tracking by multi-beam radar. The SAR platform 601 uses a racecourse track pattern 602 and a side-looking antenna with its beam pattern centred at an approximate distance of 50 km perpendicular to the flight path and along the ground surface. This distance is defined as the stand-off distance 603. The antenna is assumed capable of receiving multiple beams in parallel. By this capability a set of square 1 sqkm patches 604 are updated as the aircraft moves along its track. An update of a certain patch according to the loop C and parallel updates of the surveyed region according to loop B1 will take place with an interval of 0.53 s in our example with 10 iteration levels (9 iteration steps). This update interval of 0.53 s corresponds to a distance $L_j$ of 160 m, see table 1 for iteration step 9. The subdivision of the surveyed region into patches set by range and angular intervals as in the figure will be similar from update to update but will correspond to different pieces of the ground as the aircraft moves along its track. An approximately circular 100 sqkm large surveyed complete region 605 will be covered by such sets of patches at all times. Assuming a length 606 of the racecourse track of 75 km it will take about 500 s for the aircraft at a velocity of 300 m/s to cover one lap after which it will start a new lap and from the same position refresh detections for one particular patch. Letting the next refreshments occur for neighbouring patches which will guarantee that the patches updates will cover the surveyed region with little overlap or small gaps.

Denote the adjacent phase center channel data by primed quantities. Consider the SAR image f'(R,Φ) of the adjacent channel in the coordinates of the ordinary channel. For reasons soon to be apparent we choose to obtain the SAR image amplitude for the adjacent channel by the following formula:

$$f'(R, \Phi) = e^{-i4\pi\Delta x \Phi/\lambda} \int_{-T}^{T} F[r'_{R,\Phi}(t), t]\, dt \qquad (30)$$

We now establish the method to find the true azimuth angle $\Phi_{mover}$ to a moving target or equivalently the discrepancy $\phi = \Phi_{mover} - \Phi$ with the SAR image angle Φ. Assuming for simplicity H≪R and $\Phi_{mover}$ small we have $$r'_{R,\Phi,W}(t) \approx r_{R,\Phi,W}(t) + \Delta x \Phi_{mover} \qquad (31)$$

Since the phase center separation is much smaller than the range resolution it follows that $$F[r'_{R,\Phi}(t), t] = e^{i4\pi\Delta x \Phi_{mover}/\lambda} F[r_{R,\Phi}(t), t] \qquad (32)$$

Thus we find $$f'(R, \Phi) = e^{i4\pi\Delta x \phi/\lambda} f(R, \Phi) \Leftrightarrow \phi = \frac{\lambda}{4\pi\Delta x} \angle [f'(R, \Phi) f(R, \Phi)^*] \qquad (33)$$

where f(R,Φ)* is the conjugate of the SAR-image f(R,Φ). Equation (33) defines the φ determination criteria. The symbol ∠ stands for phase angle. This means that in equation (33) a phase angle is calculated from multiplication of the two complex expressions f(R,Φ)* and f(R,Φ). In other words this means that the φ determination process comprises the calculation of the angle φ through calculation of the angular phase difference between the two SAR images by multiplying the SAR image f'(R,Φ) from the adjacent radar channel in the coordinates of the ordinary channel with the SAR image conjugate f(R,Φ)* from the ordinary channel according to equation (33), thus receiving as a result a phase angle corresponding to the angle φ also called the φ-parameter being representative of the relative velocity of the target in relation to the moving SAR platform.

The angle φ can thus be determined by the φ determination process being accomplished by the antennas in the monopulse radar having a first and a second phase centre displaced in the azimuth direction by a distance larger than the characteristic wavelength of the radar system and smaller than the range resolution. Each phase centre is feeding data into a separate receiver channel. By forming SAR images from data from each channel, these two SAR images will become related by related coordinates corresponding to the same target position by selecting the closest assumption for velocity and acceleration for each target. A phase difference between the two SAR images for each target position represents the angle φ, or the φ-parameter, between a true and an apparent position of the target, and thus enables a complete determination of the state of motion of the target.

Therefore it will be possible by the two channels to measure both the state of motion and the target position at a certain reference time of the SAR image, according to equation (16).

The accuracy δ in the determination of position and velocity in x- and y-coordinates and directions for a moving target is determined by the following set of formulas $$\delta y_{mover} \approx \Delta R / 2 \qquad (34)$$

$$\delta x_{mover} \approx \sqrt{\left(R\frac{\Delta\Phi}{2}\right)^2 + (R\delta\phi)^2}$$

$$\delta \dot{x}_{mover} \approx \sqrt{\left(\frac{\Delta W}{2}\right)^2 + (W\phi\delta\phi)^2}$$

$$\delta \dot{y}_{mover} \approx \sqrt{\left(\phi\frac{\Delta W}{2}\right)^2 + (W\delta\phi)^2}$$

obtained from equation (16).

δφ=the accuracy of φ
ΔW=step interval for velocity increments
ΔΦ=step interval for angle increments The accuracy obtainable for φ is a matter of the influence of the noise which is superimposed on the target response, viz. the target SNR. The noise can be the defocused ground response or the thermal noise depending on whether the measurement is "inclutter" or "exclutter" ("Case1" and "Case 2" as described above). Assume for instance, that vehicle targets have an RCS (Radar Cross Section) of 5-50 sqm (square meter). Given 5×5=25 sqm ground resolution, a target reflectivity $\sigma_0^{target}$ between −7 dB and 3 dB is thus expected. An RCS of 5 sqm gives a target reflectivity of 5/25=−7 dB when the resolution is 25 sqm. An RCS of 50 sqm gives a target reflectivity of 50/25=3 dB when the resolution is 25 sqm. Open field ground reflectivity $\sigma_0$ is assumed to be −10 dB and the thermal noise equivalent ground reflectivity $\sigma_0^{noise}$ is assumed to be −30 dB. Adopt the following SNR-model given by a Gaussian antenna beam set by an antenna aperture D:

$$SNR = \frac{\sigma_0^{target}}{\sigma_0 e^{-(4\phi D/\lambda)^2} + \sigma_0^{noise}} \tag{35}$$

The ground response will have the same phase in the ordinary and adjacent SAR images but phase and amplitude will be unknown. As a consequence of this property, the accuracy $\delta\phi$ of $\phi$ can be shown to be:

$$\delta\phi = \sqrt{\frac{2}{SNR}} \frac{\lambda}{4\pi\Delta x} \sin\left(\frac{2\pi\Delta x}{\lambda}\phi\right) \tag{36}$$

Figure 7:
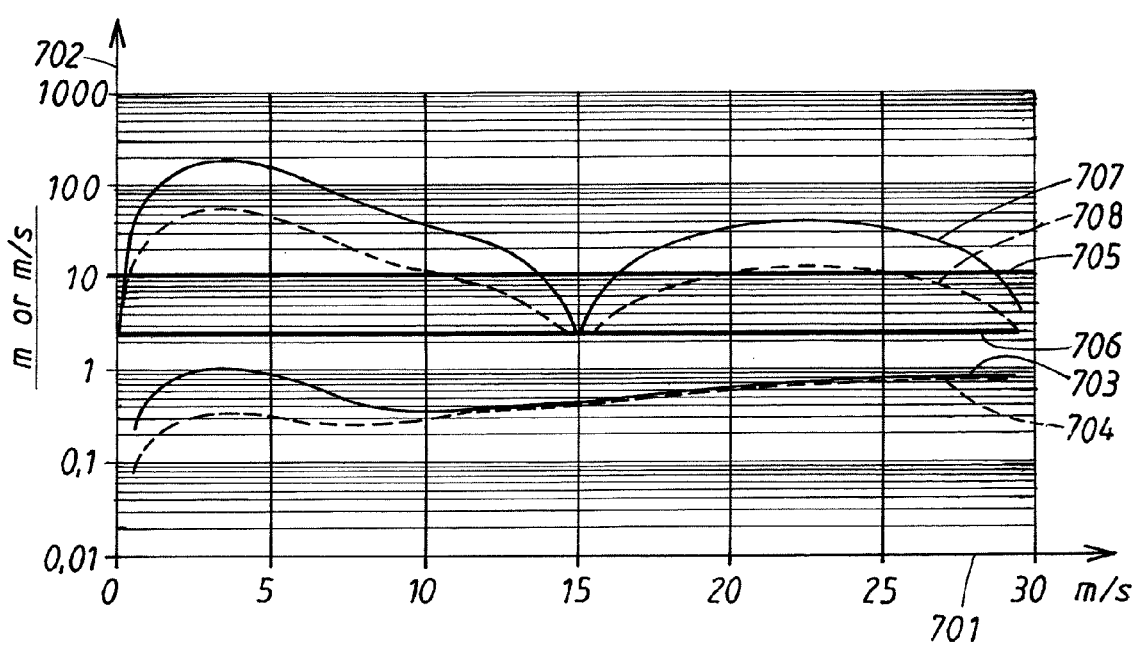
FIG. 7 schematically shows accuracy of the velocity and position motion parameters.

Combining (34), (35) and (36) we obtain the accuracy plot of FIG. 7.

FIG. 7 shows the accuracy of the velocity and position motion parameters in the considered example as function of the velocity $\dot{y}_{mover}$ in m/s on an X-axis 701. Y-axis 702 shows velocity accuracy in m/s and distance and angular accuracy in m. Continuous curves are for small vehicles (personal cars, RCS 5 sqm) and the interrupted curves are for large vehicles (RCS 50 sqm). Following curves are shown:
  Curve 703, velocity accuracy for small vehicles in y-direction
  Curve 704, velocity accuracy for large vehicles in y-direction
  Curve 705, velocity accuracy for small vehicles in x-direction
  Curve 706, distance accuracy of R for small vehicles
  Curve 707, angular accuracy expressed as R$\delta\phi$ for small vehicles
  Curve 708, angular accuracy expressed as R$\delta\phi$ for large vehicles As seen the angular accuracy and the velocity accuracy in the y-direction for very small values (<1 m/s) of $\dot{y}_{mover}$ becomes high and position accuracy will coincide with that of stationary vehicles as $\dot{y}_{mover} \rightarrow 0$. This is an important difference from GMTI. The angular accuracy will again be high at $\dot{y}_{mover}=15$ m/s which correspond to that the moving target and the ground contribution to the complete SAR-image amplitude have phases which are in opposite directions. Also note another difference from GMTI, viz. the capability of estimating the velocity parameter $\dot{x}_{mover}$. This estimate is seen to be less accurate than $\dot{y}_{mover}$.

The performance of the method is depicted in FIG. 7. Two differences from GMTI are noted viz.:
1. The method detects and focuses also targets which move along the flight axis, also defined as the azimuth direction (x-direction in FIG. 7).
2. The method transitions continuously to the detection of stationary targets by HR SAR. In particular the accuracy of measuring moving targets coincides with that of stationary SAR as the moving targets comes to rest.

These two properties are obviously very important in the process of tracking irregularly moving ground targets.

It is claimed that the method provides further advantages over combined HR SAR and GMTI for moving target detection/tracking. In fact in the case of several moving targets operating close to each other, the present method will keep track of these individuals with very high performance. This is so because their individuality is kept as long as they are assigned different parameters R,Φ in the SAR image. The value Φ is set by a combination of moving target velocity and position as explained before. By the present method Φ is determined with such a high accuracy (cf. FIG. 7) that it even when two targets move close together (which may be a matter of a few meters) and at close velocity (the velocity difference may be less 1 m/s) it is likely that they will be assigned different value of R,Φ.

Preferably a GPS system is used to calculate the position of the SAR platform and the antenna or antennas.

The invention is exemplified with an example of 10 iteration levels, certain numbers and sizes of patches and a certain velocity, height and pattern of SAR platform movement as well as a certain value of the stand-off distance. Other values of these parameters can of course be chosen within the scope of the invention.

The invention comprises a method for detecting targets comprising moving or stationary targets with a radar system equipped with Synthetic Aperture Radar, SAR, onboard a SAR platform as described above. The invention also comprises the corresponding radar system. The radar system is equipped with a Synthetic Aperture Radar, SAR, onboard a SAR platform comprising navigation equipment for accurate determination of the position of the SAR platform. The radar system is arranged for detecting targets comprising moving or stationary targets and for transversing a stationary ground region and targets in the said ground region, in which the SAR platform is arranged to obtain radar data by means of at least one antenna. The SAR platform is arranged to move essentially rectilinear and uniform in an azimuth direction with a velocity significantly larger than those of the moving targets during recording of the data. The radar system further comprises a SAR processor arranged to record the radar data and the position of the antenna or antennas for each transmitted radar pulse. Wherein, within synthetic sub-apertures each sub-aperture is arranged to cover a surveyed region being a part of the stationary ground region, radar data are:
  successively arranged to be merged in N iteration steps into SAR images of increasing resolution of the surveyed region (605) and where
  each iteration step consists of arrangement for forming a new SAR image at a new iteration level by a linear combination of neighbouring SAR images in the previous iteration step and
where the linear combination is arranged to be obtained by a relation such that related coordinates are arranged to indicate the same target position at a given reference time for all targets having a specific relative velocity with respect to the moving SAR platform and a specific degree of acceleration in the direction orthogonal to the movement of the SAR platform.

The radar system comprises an antenna upholding one or multiple simultaneous beams and also providing dual phase centres.

The invention also comprises a SAR processor used for calculating the detection and positioning of targets comprising moving or stationary targets.

The invention is not limited to the embodiments and examples above, but may vary freely within the scope of the appended claims.

The invention claimed is:

1. A method for detecting targets comprising moving and stationary targets with a radar system equipped with synthetic aperture radar onboard a synthetic aperture radar platform, comprising navigation equipment for accurate determination of the position of the synthetic aperture radar platform, and which is transversing a stationary ground region and targets in the said ground region, in which the synthetic aperture radar platform obtains radar data utilizing at least one antenna, the movement of the synthetic aperture radar platform during recording of the data being essentially rectilinear and uniform in an azimuth direction, and a velocity of the synthetic aperture radar platform being significantly larger than those of the moving targets, the radar system further comprising a synthetic aperture radar processor recording the radar data and the position of the at least one antenna for each transmitted radar pulse, and wherein within synthetic sub-apertures, each sub-aperture covering a surveyed region being a part of the stationary ground region, radar data are:

successively merged in N iteration steps into synthetic aperture radar images of increasing resolution of the surveyed region, and wherein each iteration step comprises forming a new synthetic aperture radar image at a new iteration level by a linear combination of neighbouring successively merged synthetic aperture radar images, wherein the linear combination being obtained by a relation such that related coordinates indicates the same target position at a given reference time for all targets having a specific relative velocity with respect to the moving synthetic aperture radar platform and a specific acceleration in the direction orthogonal to the movement of the synthetic aperture radar platform, wherein m iteration steps, m<N, are performed covering the surveyed region where data from one velocity computation at each iteration level using velocity increments $\Delta W_l$ of a processing velocity W, and data from one acceleration computation for acceleration increments $\Delta \ddot{y}_l$ are used in a motion insensitive process comprising an A-loop for producing one synthetic aperture radar-image of the stationary ground points and the targets per iteration level, wherein N−m further iteration steps are performed for a selected patch being a part of the surveyed region, each iteration step using a target detection process at each iteration level with data from at least three computations, comprising at least one velocity computation with the velocity increments $\Delta W_l$ and at least one acceleration computation with the acceleration increments $\Delta \ddot{y}_l$ for producing one synthetic aperture radar-image per combination of velocity and acceleration computation and for detecting targets and target tracks as well as calculating target parameters R,Φ, a processing velocity W and an acceleration $\ddot{y}$ in a direction perpendicular to the azimuth direction, the R,Φ,$\ddot{y}$,W-parameters defining an R,Φ,$\ddot{y}$,W-space for each target, wherein in a target positioning process, the target position within the patch is calculated by determining the φ-parameter representing the relative velocity of the target in relation to the moving synthetic aperture radar platform, and wherein each combination of velocity and acceleration computations represents an assumption of possible target parameters.

2. The method according to claim 1, wherein the synthetic aperture radar images in each iteration are formed for all relative velocities which are conceivable for the moving targets and all such small accelerations, which are considered consistent with keeping the velocity of the moving target constant over time, and wherein this is performed by letting the synthetic aperture radar image resolution and the density of velocity and acceleration assumptions increase with increasing iteration level to an extent such that synthetic aperture radar image pairs will remain related by related coordinates corresponding to the same target position at the synthetic aperture radar resolution of any iteration level by selecting the closest assumption within the set of assumptions for velocity and acceleration for each target made at this particular iteration level.

3. The method according to claim 1, further comprising:
a φ determination process being accomplished by said at least one antenna having a first and a second phase center displaced in the azimuth direction by a distance larger than the characteristic wavelength of the radar system and smaller than the range resolution and where each phase center is feeding data into a separate receiver channel and where by forming synthetic aperture radar images from data from each channel, these two synthetic aperture radar images being related by related coordinates corresponding to the same target position by selecting the closest assumption for velocity and acceleration for each target, a phase difference between the two synthetic aperture radar images for each target position represents an angle φ, defined as the φ-parameter, between a true and an apparent position of the target, and thus enables a complete determination of the state of motion of the target.

4. The method according to claim 1, wherein in an extended surveillance process, the surveillance area is extended to the surveyed region by using outputs from the motion insensitive process, the target detection process and the target positioning process by calculating synthetic aperture radar-images in the immediate surroundings in R,Φ,$\ddot{y}$,W-space of each track.

5. The method according to claim 4, wherein the motion insensitive process is continuously repeated over the surveyed region, each cycle defined as a loop A.

6. The method according to claim 5, wherein the moving targets for a selected patch are detected by first conducting all iterations in the A-loop requiring only just one velocity and acceleration assumption for all conceivable target velocities and accelerations and that the information from the A-loop is fed into two parallel processing paths:

in a first path comprising ex-clutter targets, i.e. targets which have an apparent position outside an antenna footprint defining the boundaries of the synthetic aperture radar image of stationary ground but a true position within the selected patch, the ex-clutter targets being possible to detect through a CFAR thresholding scheme in processing step ex-clutter CFAR, prior to further motion sensitive iteration steps which then are conducted in processing step ex-clutter iteration only for the synthetic aperture radar image fragments and velocity and acceleration parameter assumptions which are in the immediate vicinity of the position, velocity and acceleration parameters of the detected targets in a second path comprising in-clutter targets, i.e. targets which have an apparent and true position inside the antenna footprint defining the boundaries of the synthetic aperture radar image of stationary ground, and for which further in-clutter iterations, involving processing of the entire synthetic aperture radar image of the surveyed region must be performed, thus improving resolution in which the two paths are followed by a fusion of data and further CFAR evaluation in processing step CFAR resulting in the complete determination of state of motion for detections forming moving target candidates.

7. The method according to claim 6, wherein one cycle of the processing steps ex-clutter and ex-clutter-iteration is defined as a D-loop, wherein one cycle of the processing steps in the first and the second paths together with the processing step CFAR is defined as a C-loop, and wherein the C-loop is repeated at least for two cycles, the C-loop defining the target detection process.

8. The method according to claim 7, wherein the C-loop is repeated for 10 cycles.

9. The method according to claim 7, wherein a B2-loop comprises:

the target positioning process comprising processing information from the C-loop in a processing step, track, where detected target candidates are analysed according to a track validation algorithm in order to detect valid target tracks, target parameters for valid tracks being fed to processing step, target parameters, and invalid target tracks causing the selection of a new patch and initiation of a new C-loop for this new patch and wherein the detected target parameters comprising $R,\Phi,\ddot{y},W$ from processing step, target parameters, are fed to processing steps, target data and calculation of $\phi$, wherein in processing step, calculation of $\phi$, target positioning for detected targets are calculated by determining the $\phi$-parameter according to a $\phi$ determination process, the processing results from processing step, calculation of $\phi$, are fed to processing step, target data, and further wherein the processing results comprising the detected target parameters $R,\Phi,\ddot{y},W$ and $\phi$ available in processing step, target data, thus being the result of a target detection and positioning process comprising information processing in the C-loop and in the processing steps, track, target parameters and calculation of $\phi$ one cycle of which is defined as the B2-loop and wherein the completion of the B2-loop initiates the start up of a new C-loop for a new selected patch.

10. The method according to claim 9, wherein the radar system has an ordinary radar channel with an antenna having the first phase center and an adjacent radar channel with an antenna having the second phase center, both radar channels receiving simultaneous data which are fed to the synthetic aperture radar processor producing one synthetic aperture radar image for each channel, the phase centers being displaced a distance $\Delta x$ along the azimuth direction and further wherein the $\phi$ determination process comprises the calculation of $\phi$ through calculation of the angular phase difference between the two synthetic aperture radar images by multiplying the synthetic aperture radar image $f'(R,\Phi)$ from the adjacent radar channel in the coordinates of the ordinary channel with the synthetic aperture radar image conjugate $f(R,\Phi)^*$ from the ordinary channel according to:

$$f'(R,\Phi) = e^{i4\pi\Delta x\phi/\lambda}f(R,\Phi) \Leftrightarrow \phi = \frac{\lambda}{4\pi\Delta x}\angle[f'(R,\Phi)f(R,\Phi)^*]$$

thus receiving as a result the $\phi$-parameter being representative of the relative velocity of the target in relation to the moving synthetic aperture radar platform.

11. The method according to claim 9, wherein the obtained detections are represented as 5-tuples $(p,n_R,n_\Phi,n_{\ddot{y}},n_W)$, where p is a batch number ranging from 0 to P, n is the discrete representation of the state of motion parameters $R,\Phi,\ddot{y},W$ representing a particular target, a chain of detections constituting a validated target track defined by a track validation algorithm as:

$$\{(0, n_R, n_\Phi + a(0), n_{\ddot{y}} + b(0), n_W + c(0)),$$
$$..., (9, n_R, n_\Phi + a(9), n_{\ddot{y}} + b(9), n_W + c(9))\}$$

where $$\left.\begin{matrix}a(i)-a(i-1)\\b(i)-b(i-1)\\c(i)-c(i-1)\end{matrix}\right\} = -1 \text{ or } 0 \text{ or } 1$$

and where a(i), b(i), and c(i) all are integers, a(0)=b(0)=c(0)=0 and is an integer ranging from 0 to P.

12. The method according to claim 9, wherein the extended surveillance process comprises processing in a continuously repeated B1-loop information available from outputs of the B2-loop and the A-loop and where one cycle of the B1-loop comprises the following processing steps performed in series:

in a processing step further iteration the outputs of the B1- and B2-loop are used to extract out of the output of the A-loop further motion sensitive iteration steps, from the synthetic aperture radar image fragments and velocity and acceleration parameters assumptions which are in the immediate vicinity of the position, thus obtaining velocity and acceleration parameters of the detected targets, the further iteration then being conducted only for validated moving targets CFAR thresholding is performed in processing step CFAR B1 validated target tracks are generated in processing step target tracks corresponding to the processing steps track and target parameters of the B2 loop and forms the output of the B1-loop wherein by changing to a new patch in the B2-loop, the previously surveyed patches will remain updated in the B1-loop and thus validated targets tracks for the entire surveyed region will be updated by the B1-loop, whereas the B2 loop will be used to initiate new target tracks for one patch a time.

13. The method according to claim 1, wherein a GPS system is used to calculate the position of the synthetic aperture radar platform and the antenna or antennas.

14. The method according to claim 1, wherein N=9 and m=6 wherein there are 9 iteration steps and 10 iteration levels where the first iteration level is the start-up level for the first iteration corresponding to l=0.

15. The method according to claim 1, wherein the radar system operates at a frequency of around 10 GHz.

16. A radar system equipped with synthetic aperture radar onboard a synthetic aperture radar platform, comprising navigation equipment for accurate determination of the position of the synthetic aperture radar platform, the radar system being arranged for detecting targets comprising moving or stationary targets and for transversing a stationary ground region and targets in the said ground region, in which the synthetic aperture radar platform is arranged to obtain radar data utilizing at least one antenna, the synthetic aperture radar platform being arranged to move essentially rectilinear and uniform in an azimuth direction with a velocity significantly larger than those of the moving targets during recording of the data, the radar system further comprising a synthetic aperture radar processor arranged to record the radar data and the position of the antenna or antennas for each transmitted radar pulse, and wherein within synthetic sub-apertures, each sub-aperture arranged to cover a surveyed region being a part of the stationary ground region, radar data are:

successively arranged to be merged in N iteration steps into synthetic aperture radar images of increasing resolution of the surveyed region, wherein each iteration step consisting of arrangement for forming a new synthetic aperture radar image at a new iteration level by a linear combination of neighbouring synthetic aperture radar images in the previous iteration step, wherein the linear combination is arranged to be obtained by a relation such that related coordinates are arranged to indicate the same target position at a given reference time for all targets having a specific relative velocity with respect to the moving synthetic aperture radar platform and a specific acceleration in the direction orthogonal to the movement of the synthetic aperture radar platform, wherein m iteration steps, m<N, are arranged to be performed covering the surveyed region where data from one velocity computation at each iteration level using velocity increments $\Delta W_l$ of a processing velocity W, and data from one acceleration computation for acceleration increments $\Delta \ddot{y}_l$ are arranged to be used in a motion insensitive process comprising an A-loop for producing one synthetic aperture radar-image of the stationary ground points and the targets per iteration level, wherein N−m further iteration steps are arranged to be performed for a selected patch being a part of the surveyed region, each iteration step being arranged to use a target detection process at each iteration level with data from at least three computations, comprising at least one velocity computation with the velocity increments $\Delta W_l$ and at least one acceleration computation with the acceleration increments $\Delta \ddot{y}_l$ for an arrangement to produce one synthetic aperture radar-image per combination of velocity and acceleration computation and for detecting targets and target tracks as well as calculating target parameters R,Φ, a processing velocity W and an acceleration $\ddot{y}$ in a direction perpendicular to the azimuth direction, the R,Φ,$\ddot{y}$,W-parameters defining an R,Φ,$\ddot{y}$,W-space for each target, wherein in an arrangement for a target positioning process, the target position within the patch is calculated by determining the φ-parameter representing the relative velocity of the target in relation to the moving synthetic aperture radar platform, and wherein each combination of velocity and acceleration computations represents an assumption of possible target parameters.

17. The radar system according to claim 16, wherein the synthetic aperture radar images in each iteration step are arranged to be formed for all relative velocities which are conceivable for the moving targets and all such small accelerations, which are considered consistent with keeping the velocity of the moving target constant over time, and wherein this is arranged to be performed by letting the synthetic aperture radar image resolution and the density of velocity and acceleration assumptions increase with increasing iteration level to an extent such that synthetic aperture radar image pairs will remain related by related coordinates corresponding to the same target position at the synthetic aperture radar resolution of any iteration level by arranging the selection of the closest assumption within the set of assumptions for velocity and acceleration for each target made at this particular iteration level.

18. The radar system according to claim 16, further comprising:
a φ determination process being accomplished by said at least one antenna having a first and a second phase center displaced in the azimuth direction by a distance larger than the characteristic wavelength of the radar system and smaller than the range resolution and where each phase center is arranged to feed data into a separate receiver channel and where by arranging the formation of synthetic aperture radar images from data from each channel, these two synthetic aperture radar images being related by related coordinates corresponding to the same target position by arranging for the selection of the closest assumption for velocity and acceleration for each target, a phase difference between the two synthetic aperture radar images for each target position representing an angle φ, defined as the φ-parameter, between a true and an apparent position of the target, and thus enables a complete determination of the state of motion of the target.

19. The radar system according to claim 16, wherein in an arrangement for an extended surveillance process, the surveillance area is extended to the surveyed region by using outputs from the motion insensitive process, the target detection process and the target positioning process by calculating synthetic aperture radar-images in the immediate surroundings in R,Φ,$\ddot{y}$,W-space of each track.

20. The radar system according to claim 16, wherein the radar system comprises a synthetic aperture radar and an antenna upholding one or multiple simultaneous beams and also providing dual phase centers.

21. The radar system according to claim 16, wherein the radar system operates at a frequency of around 10 GHz.

22. A synthetic aperture radar processor used for calculating the detection and positioning of targets comprising moving and stationary targets according to the method according to claim 1.

* * * * *

UNITED STATES PATENT AND TRADEMARK OFFICE
CERTIFICATE OF CORRECTION

| | | |
|---|---|---|
| PATENT NO. | : 8,698,668 B2 | Page 1 of 1 |
| APPLICATION NO. | : 13/128642 | |
| DATED | : April 15, 2014 | |
| INVENTOR(S) | : Hellsten | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 386 days.

Signed and Sealed this
Eleventh Day of August, 2015

Michelle K. Lee
*Director of the United States Patent and Trademark Office*